United States Patent
Inoue et al.

(10) Patent No.: US 9,401,775 B2
(45) Date of Patent: Jul. 26, 2016

(54) COMMUNICATION METHOD, INFORMATION PROCESSING APPARATUS, AND RECORDING MEDIUM

(71) Applicant: FUJITSU LIMITED, Kawasaki-shi, Kanagawa (JP)

(72) Inventors: Minoru Inoue, Himeji (JP); Takahiro Takenaka, Kobe (JP); Daisuke Fujita, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 141 days.

(21) Appl. No.: 14/105,978

(22) Filed: Dec. 13, 2013

(65) Prior Publication Data

US 2014/0185444 A1    Jul. 3, 2014

(30) Foreign Application Priority Data

Dec. 27, 2012   (JP) .................. 2012-285313

(51) Int. Cl.
*H04L 12/801* (2013.01)
*H04L 1/00* (2006.01)
*H04L 12/807* (2013.01)
*H04L 12/835* (2013.01)
*H04L 29/06* (2006.01)

(52) U.S. Cl.
CPC *H04L 1/00* (2013.01); *H04L 47/27* (2013.01); *H04L 47/30* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 6,141,324 A | 10/2000 | Abbott et al. | |
| 6,643,259 B1 * | 11/2003 | Borella et al. | 370/231 |
| 2005/0286416 A1 * | 12/2005 | Shimonishi et al. | 370/229 |
| 2011/0173312 A1 * | 7/2011 | Robin | 709/223 |
| 2011/0261691 A1 * | 10/2011 | Jin et al. | 370/230 |
| 2012/0257671 A1 * | 10/2012 | Brockmann et al. | 375/240.02 |

FOREIGN PATENT DOCUMENTS

| | | |
|---|---|---|
| JP | 2002-169738 | 6/2002 |
| JP | 2002-524915 | 8/2002 |
| JP | 2007-201702 | 8/2007 |
| JP | 2009-71360 | 4/2009 |
| WO | WO 00/13357 | 3/2000 |

OTHER PUBLICATIONS

Office Action issued by the Japanese Patent Office on Apr. 26, 2016 in corresponding Japanese patent application No. 2012-285313.

* cited by examiner

*Primary Examiner* — Robert C Scheibel
(74) *Attorney, Agent, or Firm* — Staas & Halsey LLP

(57) ABSTRACT

A communication method executed by an information processing apparatus capable of transmitting data to another information processing apparatus, the method includes: setting a first threshold as an amount of data capable of being transmitted without waiting for a reply from the another information processing apparatus; transmitting a first data having a data amount less than or equal to the first threshold to the another information processing apparatus; acquiring from the another information processing apparatus processing time information taken to process the first data by the another information processing apparatus; and changing the first threshold concerning the data amount into a second threshold based on the processing time information.

6 Claims, 19 Drawing Sheets

FIG. 5

| PROCESSING SPEED | COMMUNICATION SPEED | PACKET LOSS RATIO | RTT | VARIATION AMOUNT $\beta$ |
|---|---|---|---|---|
| INCREASE | – | – | – | +1 |
| DECREASE | – | – | – | -1 |
| – | INCREASE | – | – | +1 |
| – | DECREASE | – | – | -1 |
| – | – | DECREASE | – | +1 |
| – | – | – | INCREASE | +1 |
| – | – | – | DECREASE | -1 |
| INCREASE | INCREASE | – | – | +2 |
| INCREASE | DECREASE | – | – | 0 |
| DECREASE | INCREASE | – | – | 0 |
| DECREASE | DECREASE | – | – | -2 |
| INCREASE | INCREASE | DECREASE | – | +3 |
| INCREASE | INCREASE | INCREASE | – | +1 |
| ⋮ | ⋮ | ⋮ | ⋮ | ⋮ |
| INCREASE | INCREASE | DECREASE | INCREASE | +4 |
| INCREASE | INCREASE | DECREASE | DECREASE | +2 |
| ⋮ | ⋮ | ⋮ | ⋮ | ⋮ |

COMMUNICATION METHOD, INFORMATION PROCESSING APPARATUS, AND RECORDING MEDIUM

CROSS-REFERENCE TO RELATED APPLICATION

This application is based upon and claims the benefit of priority from the prior Japanese Patent Application No. 2012-285313 filed on Dec. 27, 2012, the entire contents of which are incorporated herein by reference.

FIELD

The present disclosure relates to a communication method, an information processing apparatus and a recording medium.

BACKGROUND

Various networks such as the Internet, a local area network (LAN), a wide area network (WAN), a mobile telephone network are being utilized for data communication. In many data communication, a certain transport layer protocols utilized in order to control an end-to-end communication between a transmitting apparatus which generates data and a receiving apparatus which is the final destination of data, thereby appropriately transferring data to an application layer. A connection type transmission control protocol (TCP) and a connectionless type user datagram protocol (UDP) have been known as for the example of the transport layer protocol.

In the TCP, when a data packet is normally received, the receiving apparatus replies by sending an acknowledgement (ACK) packet to the transmitting apparatus in order to assure that the data packet has arrived at the receiving apparatus. When an expected ACK packet is not received within a predetermined time after a data packet is transmitted, the transmitting apparatus re-transmits the data packet. However, when the transmitting apparatus waits for an ACK after transmitting each data packet to transmit a next data packet, the throughput of data transmission may become lower. Therefore, in the TCP, the transmitting apparatus is able to transmit a plurality of data packets consecutively without waiting for the ACK within a range of a receive window size of the receiving apparatus. The receive window size is determined based on the free space of a buffer of the transport layer available in the receiving apparatus, and the determined receive window size is notified from the receiving apparatus to the transmitting apparatus.

As described above, the TCP is a highly reliable transport layer protocol and often used in combination with an application layer protocol such as a file transfer protocol (FTP) or a hypertext transfer protocol (HTTP). In the meantime, the UDP is the light weight protocol of the transport layer in which arrival confirmation by the ACK is not performed, and is often used in a data communication where the throughput and real time property of communication are important factors. However, the UDP is a protocol having a high degree of design freedom and thus, may implement a function independently for increasing the reliability of the upper layer protocol of the UDP.

For example, a communication system has been proposed in which a function such as a forward error correction (FEC) encoding or re-transmission control is implemented in combination with the UDP and thus, the balance between the real time property and reliability of communication is achieved. Further, regarding the retransmission control, a file distribution method has been proposed in which a file is divided into a plurality of data blocks, and each data block is numbered for transmission. A retransmission request is then received after all of the data blocks of a file are transmitted thereby suppressing the traffic amount.

International Publication Pamphlet No. WO 00/13357 and Japanese Laid-open Patent Publication No. 2002-169738 have been known as an example of the prior art.

As described above, there has been a communication system in which the arrival confirmation is performed where the transmitting apparatus consecutively transmits a certain amount of data without waiting for an arrival confirmation from the receiving apparatus. However, the amount of data that can be transmitted without waiting for an arrival confirmation does not appropriately reflect a current data processing load of the receiving apparatus. Accordingly, there is a problem in that the receiving apparatus becomes an overloaded state and thus, an overflow may occur without completely processing the received data.

In a case of the TCP, the receive window size of the receiving apparatus is determined based on the free space of the buffer of the transport layer. Therefore, when data is transferred from the transport layer to an upper layer such as an application layer, the free space of the transport layer buffer increases and the receive window size becomes larger. However, when a processing (e.g., error correction decoding) which requires a large quantity of calculation and a low speed processing (e.g., writing of data into the auxiliary storage device) is performed in the upper layer protocol, the data processing in the upper layer may become a bottleneck. In this case, the memory region of the upper layer protocol may possibly be overflow.

SUMMARY

According to one aspect of the embodiments, there is provided an information processing apparatus which includes a memory and a processor coupled to the memory. The processor is configured to set a first threshold as an amount of data capable of being transmitted without waiting for a reply from another computer, transmit a first data having a data amount less than or equal to the first threshold to the another computer, acquire from the another computer processing time information taken to process the first data by the another computer, and change the first threshold concerning the data amount into a second threshold based on the processing time information.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF DRAWINGS

FIG. 5 is a view illustrating an example of a mapping table.

DESCRIPTION OF EMBODIMENT(S)

Hereinafter, embodiments will be described with reference to accompanying drawings.

First Embodiment

A first embodiment will be described.

Figure 1:
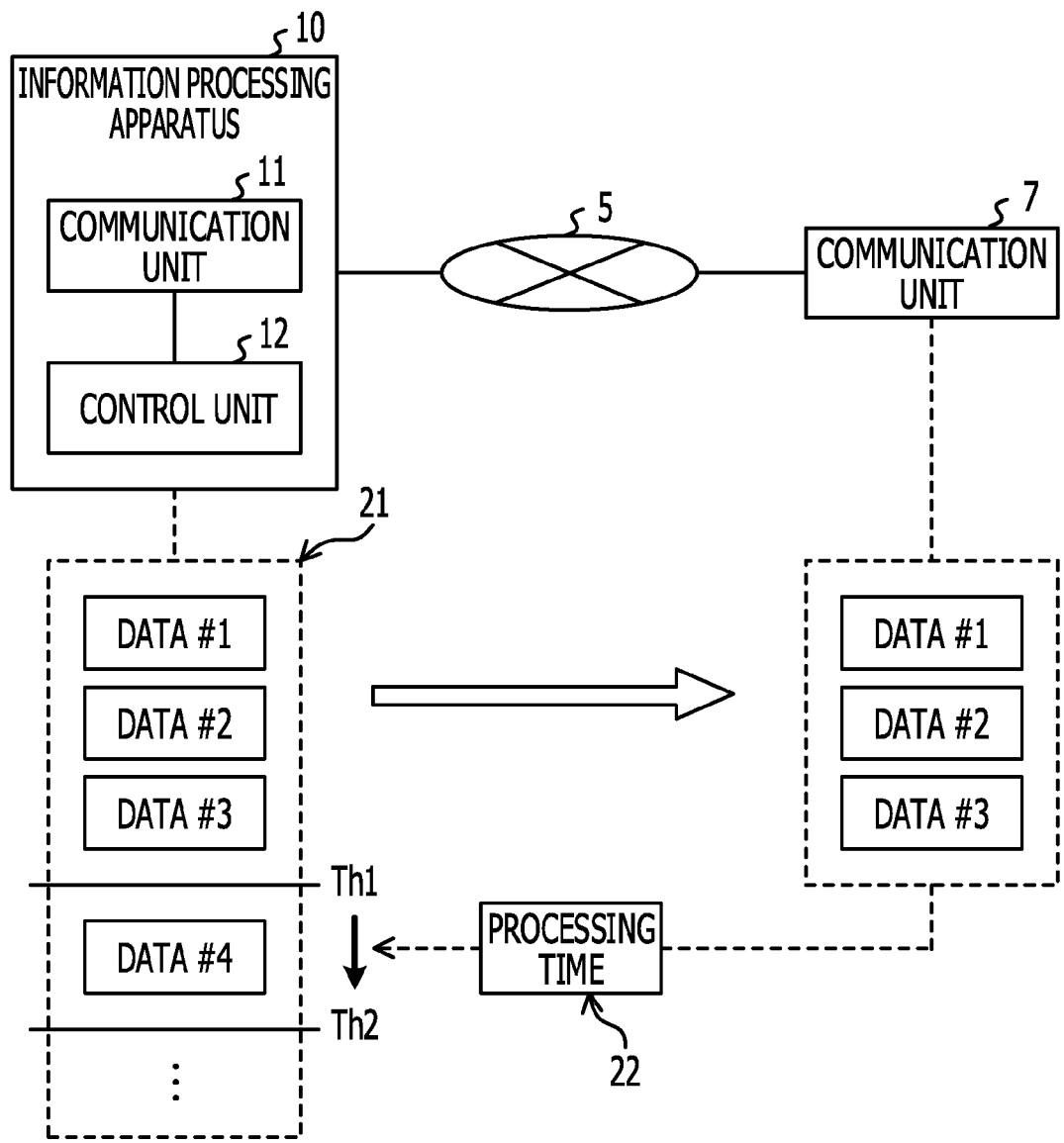
FIG. 1 is a view illustrating, for example, an exemplary information processing apparatus according to a first embodiment.

FIG. 1 is a view illustrating, for example, an exemplary information processing apparatus according to a first embodiment. As illustrated in FIG. 1, an information processing apparatus 10 according to the first embodiment includes a communication unit 11 and a control unit 12. Further, the information processing apparatus 10 is coupled with the other information processing apparatus 7 through a network 5.

Although not illustrated, each of the information processing apparatus 10 and the information processing apparatus 7 includes a storage device. The storage device may be a volatile storage device such as a random access memory (RAM) or a non-volatile storage device such as a hard disk drive (HDD) or a flash memory.

Further, the control unit 12 may be a processor such as a central processing unit (CPU) or a digital signal processor (DSP). Further, the control unit 12 may also be an electronic circuit such as an application specific integrated circuit (ASIC) or a field programmable gate array (FPGA). Further, the control unit 12 executes a program stored in the storage device described above or other memory.

The communication unit 11 transmits the first data #1, #2 and #3 to the other information processing apparatus 7, receives from the other information processing apparatus 7 a processing time information 22 according to a time taken to process the first data #1~#3 by the other information processing apparatus 7 and transmits the second data #1~#4 to the other information processing apparatus 7.

The control unit 12 sets a threshold of the amount of data capable of being transmitted without waiting for a reply from the other information processing apparatus 7 to a first threshold Th1, and limits an amount of the first data to the first threshold Th1 or less. Further, the control unit 12 changes the threshold of the data amount from the first threshold Th1 to a second threshold Th2 based on the processing time information 22, and limits the amount of the second data #1~#4 to the second threshold Th2 or less.

Accordingly, the amount of data 21 capable of being transmitted without waiting for a reply from the other information processing apparatus 7 according to the processing time information 22 is adjusted, and as a result, it becomes possible to control the amount of transmission data considering the load condition of the other information processing apparatus 7. For example, in a case where a delay occurs when the other information processing apparatus 7 stores data in the storage device, the amount of transmission data is adjusted to be small and thus, it is possible to avoid a situation where a buffer provided in the front end of the storage device overflows. As a result, a high throughput may be stably maintained. The first embodiment has been described.

Second Embodiment

A second embodiment will be described.

(System Description)

Figure 2:
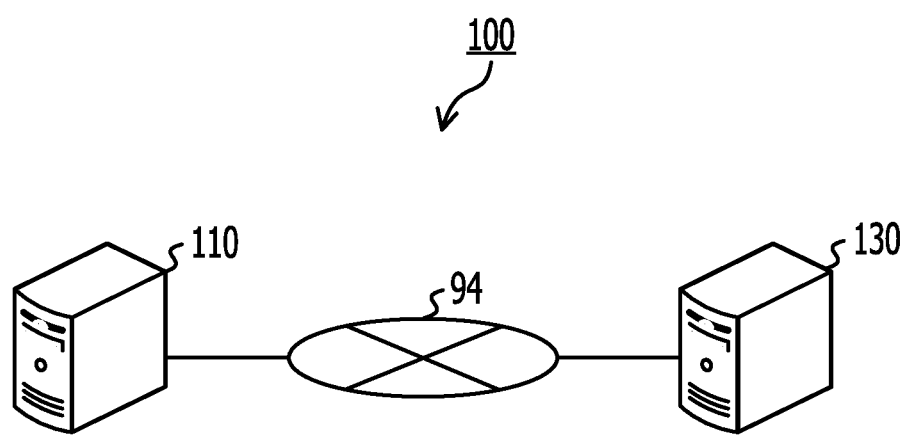
FIG. 2 is a view illustrating an exemplary communication system according to a second embodiment.

First of all, description will be made on the communication system 100 according to a second embodiment with reference to FIG. 2. FIG. 2 is a view illustrating an exemplary communication system according to a second embodiment.

As illustrated in FIG. 2, the communication system 100 includes an information processing apparatus 110 and an information processing apparatus 130 coupled to the information processing apparatus 110 through a network 94. Additionally, in the following description, the information processing apparatus 110 may be referred to as a transmission side and the information processing apparatus 130 may be referred to as a reception side. Further, for convenience of description, description will be made on an exemplary case where data is transmitted from the information processing apparatus 110 to the information processing apparatus 130. However, data may be transmitted in an opposite direction from the information processing apparatus 130 to the information processing apparatus 110.

Information processing apparatuses 110 and 130 may be represented as a stationary type computer, but may be any type of computer other than the stationary type computer in the example of FIG. 2. For example, the information processing apparatus 110 may be a notebook PC, a tablet computer, a portable telephone, a smart phone, a digital camera or a car navigation system. Further, the information processing apparatus 110 may be a wireless base station, a wireless communication terminal, a router, a hub, a modem, a communication equipment for satellite communication, or other type of communication equipments. Further, the type of the information processing apparatus 110 is also similarly applied to the information processing apparatus 110.

Further, the information processing apparatus 110 is represented as a single computer in the example of FIG. 2, but may be a parallel type computer to which a plurality of computers are coupled or a cloud computing system. In this case, some or all of the functions implemented in the information processing apparatus 110 are implemented using a plurality of computers. In the meantime, the matters described above may be similarly applied to the information processing apparatus 130. Further, the functionality of one of the information processing apparatuses 110 and 130 may be implemented by a single computer, and the functionality of the other of the information processing apparatuses 110 and 130 may be implemented by a plurality of computers.

(Hardware)

Figure 3:
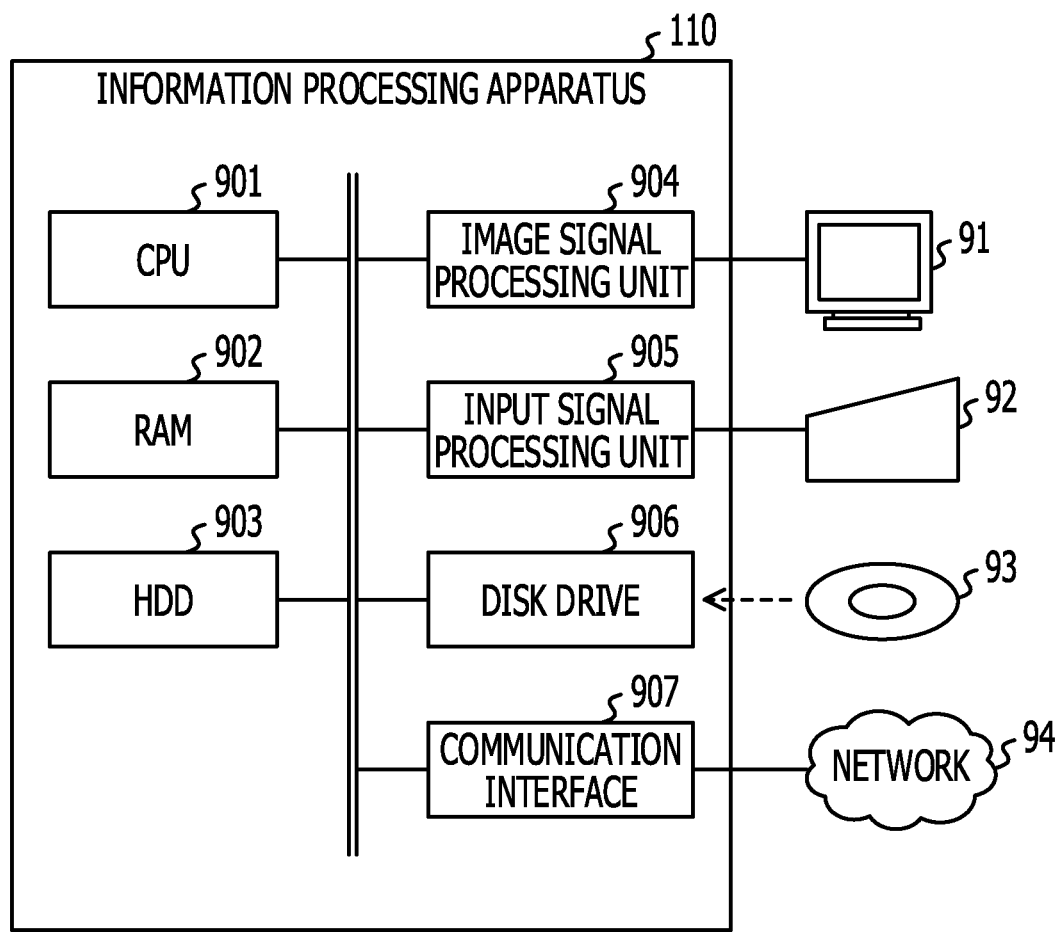
FIG. 3 is a view illustrating an exemplary hardware of the information processing apparatus according to the second embodiment.

Further, the functionality of the information processing apparatus 110 may be implemented by the hardware represented in FIG. 3. FIG. 3 is a view illustrating an exemplary hardware of the information processing apparatus according to the second embodiment. Further, while a combination of the hardware components illustrated in FIG. 3 is an example, some components may be omitted or new component may be added thereto.

As illustrated in FIG. 3, the information processing apparatus 110 includes, for example, a CPU 901, a RAM 902, a HDD 903, an image signal processing unit 904, an input signal processing unit 905, a disk drive 906 and a communication interface 907.

The CPU 901 is an example of the control unit 12 according to the first embodiment. Further, the RAM 902 and the HDD 903 are examples of a storage device according to the first embodiment. Further, the communication interface 907 is an example of the communication unit 11 according to the first embodiment.

The CPU 901 is a processor including an operational device which executes instructions described in a program. The CPU 901 loads at least some of data or program stored in the HDD 903 into the RAM 902 and executes the instruction described in the program. Additionally, the CPU 901 may include a plurality of processor cores. Further, the information processing apparatus 110 may be installed with a plurality of CPUs 901. In this case, the information processing apparatus 110 may perform a processing with a parallel execution.

The RAM 902 is a volatile memory for temporarily storing a program executed by the CPU 901 or data used in the processing. Further, the information processing apparatus 110 may include other type of memory than the RAM 902. Further, the information processing apparatus 110 may include a plurality of memories.

The HDD 903 is an example of non-volatile storage device for storing a program such as an operating system (OS), firmware, an application software, or data used in the processing. Further, the information processing apparatus 110 may include another type of storage device, such as a flash memory or a solid state drive (SSD), which is different from the HDD 903. Further, the information processing apparatus 110 may include a plurality of storage devices.

The image signal processing unit 904 is controlled by the CPU 901 to output an image to a display device 91 coupled to the information processing apparatus 110. The display device 91 may be, for example, a cathode ray tube (CRT), a liquid crystal display (LCD), a plasma display panel (PDP), or an organic electro-luminescence display (OELD).

The input signal processing unit 905 acquires an input signal from an input device 92 coupled to the information processing apparatus 110 and notifies the CPU 901. For example, a mouse, a keyboard, a touch panel, a touch pad, a track ball, a remote controller or a button switch may be used as the input device 92.

The disk drive 906 is a reading-out apparatus which reads the program or data recorded in a recording medium 93. A magnetic disk such as a flexible disk (FD) or a HDD, an optical disk such as a compact disk (CD) or a digital versatile disk (DVD), and an optomagnetic disk such as a magneto-optical disk (MO) may be used as the recording medium 93. The disk drive 906 is controlled by, for example, the CPU 901 to store the program or data read from the recording medium 93 in the RAM 902 or the HDD 903.

The communication interface 907 is an interface for communicating with the other computer through the network 94. The communication interface 907 may be a wired interface or a wireless interface. Further, the communication interface 907 may be a communication interface for satellite communication or a communication interface for coupling to the mobile telephone network.

(Function of Information Processing Apparatus 110)

Figure 4:
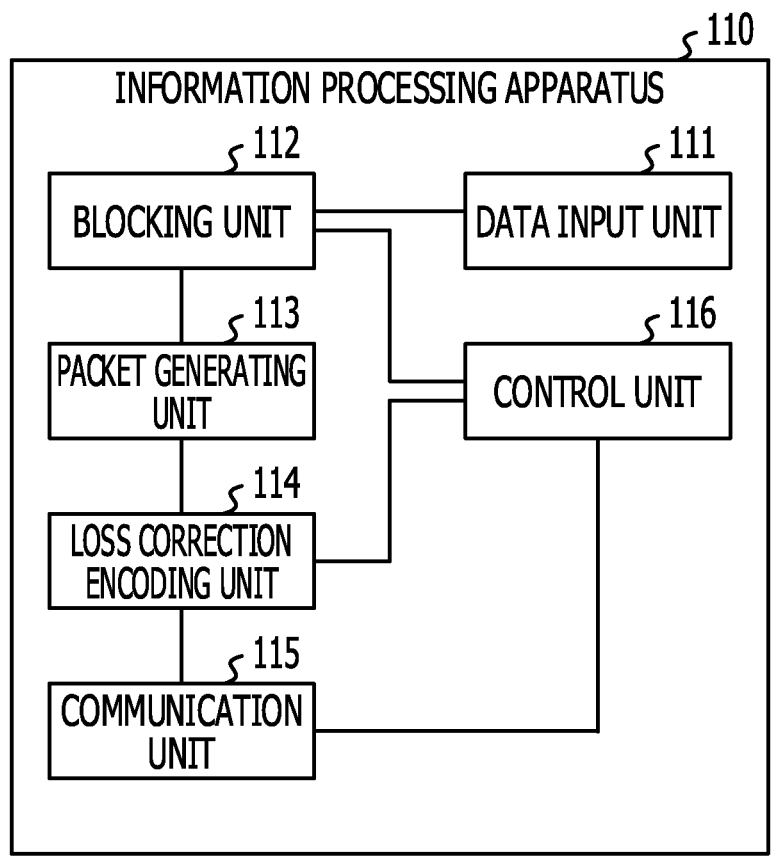
FIG. 4 is a block diagram illustrating an example of a function of the information processing apparatus of a transmission side according to the second embodiment.

The information processing apparatus 110 may implement functions as illustrated in FIG. 4 using the hardware as described above. FIG. 4 is a block diagram illustrating an example of function of an information processing apparatus of a transmission side according to the second embodiment.

As illustrated in FIG. 4, the information processing apparatus 110 includes a data input unit 111, a blocking unit 112, a packet generating unit 113, a loss correction encoding unit 114, a communication unit 115 and a control unit 116.

Further, some or all of functions implemented in the blocking unit 112, the packet generating unit 113, the loss correction encoding unit 114, the communication unit 115 and the control unit are implemented as a program module executed by CPU 901. Further, some or all of functions implemented in the blocking unit 112, the packet generating unit 113, the loss correction encoding unit 114, the communication unit 115 and the control unit may be implemented by an electronic circuit rather than software.

Data to be transmitted to the information processing apparatus 130 of the reception side is input to the data input unit 111. Data input to the data input unit 111 may be provided from the application software executed by an external computer which is different from the information processing apparatus 110 or the application software executed by the information processing apparatus 110. Data input to the data input unit 111 is input to the blocking unit 112.

The blocking unit 112 makes data input from the data input unit 111 into a block (e.g., blocking). Herein, the blocking refers to a processing in which a predetermined amount of data is accumulated and the accumulated data is managed as a so-called data block. Each data block formed by the blocking unit 112 is input to the packet generating unit 113. The packet generating unit 113 divides each data block into a plurality of data portion and appends a header to each data portion to generate a plurality of the data packets. For example, an identification information of the application software, which outputted data of the corresponding data portion, or information such as a data length is included in the header.

A plurality of data packets corresponding to each block generated by the packet generating unit 113 are input to the loss correction encoding unit 114. The loss correction encoding unit 114 encodes the plurality of data packets input from the packet generating unit 113 to generate a plurality of parity packets. For example, an encoding scheme using a loss correction code, such as an RPS code, may be applied. The loss correction code is a type of FEC code. In a scheme using the FEC code, redundancy is added to data in advance in the transmission side, and even when some packets are lost on a transmission path, an original data may be recovered without obtaining additional information from the reception side.

The plurality of parity packets generated for each block by the loss correction encoding unit 114 are input to the communication unit 115. Further, an error detection code such as a cyclic redundancy check (CRC) may be added to each parity packet. The communication unit 115 transmits the plurality of parity packets generated by the loss correction encoding unit 114 to the information processing apparatus 130 of the reception side.

Further, the communication unit 115 acquires at least the processing time information taken to execute the loss correction decoding process from the information processing apparatus 130 of the reception side. Further, the communication unit 115 acquires information indicating the amount of data included in the plurality of the data packets recovered in the information processing apparatus 130 of the reception side. The information is delivered by being included in a transmission confirmation transmitted from the information processing apparatus 130 of the reception side at the time when one-time loss correction process is completed. The processing time information and the data amount information acquired by the communication unit 115 are input to the control unit 116.

Further, when all the data packets are not recovered by one-time loss correction process, the information processing apparatus 130 of the reception side requests the information processing apparatus 110 of the transmission side to retransmit the parity packet. In this case, the communication unit 115 receives a retransmission request from the information processing apparatus 130 of the reception side. The processing time information and the data amount information are included in the retransmission request. Also, in this case, the processing time information and the data amount information acquired by the communication unit 115 are input to the control unit 116.

The control unit 116 calculates a processing speed which indicates an amount of data processed per unit time in the information processing apparatus 130 of the reception side based on the processing time information and the data amount information input from the communication unit 115. Further, the control unit 116 maintains the calculated processing speed information. However, the control unit 116 may be allowed to maintain only the processing speed information with respect to a block transmitted at this time (a current block) and a block transmitted at a previous time (a block next to before).

When the processing speed for the current block is slower than the processing speed for the block next to before, the control unit 116 determines that a processing load of the information processing apparatus 130 of the reception side is increased. In this case, the control unit 116 decreases an amount of data, for example, to be included in a block. Further, when it is determined that the processing load of the information processing apparatus 130 of the reception side is increased, the control unit 116 may decrease the number of combination of the parity packets with which each data packet may be recovered.

In the meantime, when the processing speed for the current block is faster than the processing speed for the block next to before, the control unit 116 determines that the processing load of the information processing apparatus 130 of the reception side is decreased. In this case, the control unit 116 increases an amount of data, for example, to be included in a block. Further, when it is determined that the processing load of the information processing apparatus 130 of the reception side is decreased, the control unit 116 may increase the number of combination of the parity packets with which each data packet may be recovered.

Further, the control unit 116 calculates, for example, the communication speed, the packet loss ratio and the round trip time (RU). The communication speed is calculated based on an amount of data that would have been transmitted per unit time. The packet loss ratio is a ratio of the data packet that would have been able to be recovered at the reception side among the transmitted data packets. However, the packet loss ratio is calculated based on the number of the data packets that are recovered before the retransmission control starts.

Further, the RTT corresponds to a time calculated by subtracting a processing time from a time spanning from the start of transmission to the reception of the transmission confirmation. In a case of the TCP, when the processing in the transport layer is completed, the ACK is returned from the information processing apparatus of the reception side to the information processing apparatus of the transmission side. As a result, the time taken until the ACK is received after data is transmitted corresponds to the RU. However, in a scheme of the second embodiment, after the processing in the application layer is completed, information of the time taken for the application layer processing is transmitted by being included in the transmission confirmation. As a result, the time calculated by subtracting the processing time in the application layer from a time taken until the transmission confirmation is received after the transmission starts is the RU.

When the processing speed, the communication speed, the packet loss ratio, and the RTT for the block next to before and the current block are changed, the control unit 116 adjusts the number of data to be included in a single block or the number of combination of the parity packets with which each data packet may be recovered.

When the packet loss ratio for the current block is larger than the packet loss ratio for the block next to before, the control unit 116 sets a temporary set value α of the number of data to be included in a single block to the number of data included in the block next to before. On the contrary, when the packet loss ratio for the current block is less than or equal to the packet loss ratio for the block next to before, the control unit 116 sets the temporary set value α of the number of data to be included in a single block to the number of data included in the current block.

Also, the control unit 116 refers to a mapping table to be described below to comprehensively consider the change of the processing speed, the communication speed, the packet loss ratio, and RU, and adjusts the number of data to be included in a single block based on the temporary set value α. Further, the control unit 116 may adjust the number of combination of the parity packets with which each data packet may be recovered.

For example, when the processing speed, the packet loss ratio, and the RTT for the current block are the same as those of the block next to before and the communication speed of the current block is increased as compared to that of the block next to before, the control unit 116 sets the number of data to be included in a single block to be larger than the temporary set value α. Further, in this case, the control unit 116 may increase the number of combination of the parity packets with which each data packet may be recovered.

On the contrary, when the processing speed, the packet loss ratio, and the RTT for the current block are the same as those of the block next to before and the communication speed of the current block is decreased as compared to that of the block next to before, the control unit 116 sets the number of data to be included in a single block to be smaller than the temporary set value α. Further, in this case, the control unit 116 may decrease the number of combination of the parity packets with which each data packet may be recovered.

Further, when the processing speed, the communication speed, and the RTT for the current block are the same as those of the block next to before and the packet loss ratio of the current block is decreased as compared to that of the block next to before, the control unit 116 sets the number of data to be included in a single block to be larger than the temporary set value α. Further, in this case, the control unit 116 may decrease the number of combination of the parity packets with which each data packet may be recovered.

When the RTT for the current block is larger than that for the block next to before, the number of data to be included in a single block is increased to reduce the frequency of the transmission confirmation. As a result, the throughput may be enhanced. Therefore, when the processing speed, the communication speed, and packet loss ratio for the current block are the same as those of the block next to before and the RTT of the current block is increased as compared to that of the block next to before, the control unit 116 sets the number of data to be included in a single block to be larger than the temporary set value α. On the contrary, when the processing speed, the communication speed, and packet loss ratio for the current block are the same as those of the block next to before and the RTT of the current block is decreased as compared to that of the block next to before, the control unit 116 decreases the number of data to be included in a single block to be smaller than the temporary set value α.

Many data may be transmitted at a time without waiting for the transmission confirmation by increasing the number of data to be included in a single block and thus, the frequency of the transmission confirmation may be reduced. Further, the loss correction capability is enhanced by increasing the number of combination of the parity packet with which each data packet may be recovered. As a result, the frequency of the retransmission control may be reduced.

Further, the processing load for decoding may be reduced by decreasing the number of data to be included in a single block. Further, the processing load for decoding may be reduced by decreasing the number of combination of the parity packets with which each data packet may be recovered. Further, the number of parity packets to be transmitted to recover a single data packet may be reduced by decreasing the number of combination of the parity packet with which each data packet may be recovered.

As described above, the number of data to be included in a single block or the number of parity packets to be utilized to recover a single data block may be controlled by considering the processing speed, the communication speed, the packet loss ratio and the RTT and thus, the high throughput may be stably maintained.

Further, when some of the data packets may not be recovered in the information processing apparatus 130 of the reception side, the control unit 116 executes the retransmission control of the parity packet. In this case, the control unit 116 retransmits the parity packet used for recovering the data packet which was not recoverable. For example, in a case where the data packet #1 may be recovered using the parity packets A and B, when the parity packet B is lost on the transmission path, the data packet #1 becomes unrecoverable. In this case, the control unit 116 retransmits at least the parity packet B.

The function of the information processing apparatus 110 of the transmission side has been described.

(Mapping Table)

Here, the mapping table will be described with reference to FIG. 5. FIG. 5 is a view illustrating an example of a mapping table. In the mapping table, the relationship between the processing speed, the communication speed, the packet loss ratio, the RTT and an amount of variation β is described. The amount of variation β indicates an amount of data to be increased or decreased from the temporary set value α for the amount of data to be included in a single block. For example, when it is increased from the temporary set value α by 1 (one), the amount of variation β becomes "+1". On the contrary, when it is decreased from the temporary set value α by 1 (one), the amount of variation β becomes "−1". Further, "−" is indicated in a column of an item for which there is no variation in the block next to before and the current block.

For example, when the communication speed, the packet loss ratio, and the RTT of the block next to before are the same as those of the current block and the processing speed of the current block is increased, the amount of variation β becomes "+1". In this case, the control unit 116 sets the number of data to be included in a single block to be larger than the temporary set value α by 1 (one). On the contrary, when the communication speed, the packet loss ratio, and the RTT of the block next to before are the same as those of the current block and the processing speed of the current block is decreased, the amount of variation β becomes "−1". In this case, the control unit 116 sets the number of data to be included in a single block to be smaller than the temporary set value α by 1 (one).

Further, when the packet loss ratio and the RTT of the block next to before are the same as those of the current block and the processing speed and the communication speed of the current block are increased, the amount of variation β becomes "+2". In this case, the control unit 116 sets the number of data to be included in a single block to be larger than the temporary set value α by 2 (two). As such, the amount of variation β for a case where two elements among the processing speed, the communication speed, the packet loss ratio and the RTT are changed into a favorable direction is set to be larger compared to a case where a single element is changed into a favorable direction (a direction that the communication situation is improved).

Further, when the packet loss ratio and the RTT of the block next to before are the same as those of the current block and the processing speed is increased and the communication speed of the current block is decreased, the amount of variation β becomes "0". In this case, the control unit 116 sets the number of data to be included in a single block to the temporary set value α as it is. As such, for a case where the amount of variation β for a case where one element is changed into a favorable direction and the other elements are changed into an unfavorable direction (a direction that the communication situation is deteriorated) among the processing speed, the communication speed, the packet loss ratio and the RTT are changed into a favorable direction, the amount of variation β is set ("0" in the example of FIG. 5) such that the effects due to the changing into the favorable and unfavorable directions are cancelled out each other.

As described above, the amount of variation β is set for every four elements in the mapping table such that the changed direction of each of the processing speed, the communication speed, the packet loss ratio and the RTT is comprehensively considered to determine the number of data to be included in a single block. In the meantime, the mapping table illustrated in FIG. 5 is an example. For example, when one element is changed into a favorable direction, the amount of variation β may be set such that the number of data to be included in a single block is increased by 2 (two) or more.

A description has been made on the mapping table.

(Function of Information Processing Apparatus 130)

Figure 6:
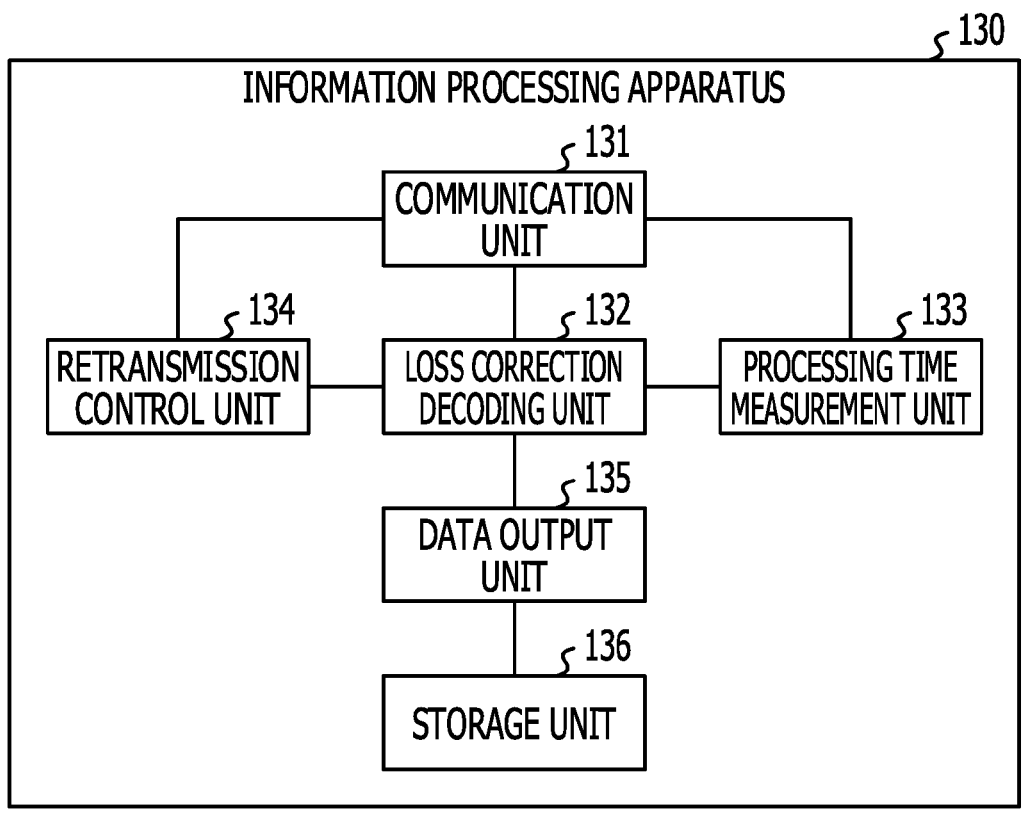
FIG. 6 is a block diagram illustrating an example of a function of the information processing apparatus of a reception side according to the second embodiment.

Subsequently, the function of the information processing apparatus 130 of the reception side will be described with reference to FIG. 6. FIG. 6 is a block diagram illustrating an example of the function of the information processing apparatus of the reception side according to the second embodiment. The function implemented in the information processing apparatus 130 of the reception side is implemented using hardware which is the same as that of the information processing apparatus 110 of the transmission side.

As illustrated in FIG. 6, the information processing apparatus 130 includes a communication unit 131, a loss correction decoding unit 132, a processing time measurement unit 133, a retransmission control unit 134, a data output unit 135 and a storage unit 136.

Further, some or all of the functions implemented in the communication unit 131, the loss correction decoding unit 132, the processing time measurement unit 133, the retransmission control unit 134 and the data output unit 135 are implemented as a program module executed by the CPU 901. Further, some or all of the functions implemented in the communication unit 131, the loss correction decoding unit 132, the processing time measurement unit 133, the retransmission control unit 134 and the data output unit 135 may be implemented by an electronic circuit rather than software. Further, the storage unit 136 is a storage area secured in a RAM 902 and a HDD 903.

The communication unit 131 receives a plurality of parity packets corresponding to a single block transmitted from the information processing apparatus 110 of the transmission side. The plurality of parity packets received by the communication unit 131 are input to the loss correction decoding unit 132. The loss correction decoding unit 132 executes error detection for each parity packet. Further, the loss correction decoding unit 132 executes the loss correction decoding process to recover the original data packet using the correctly received parity packets among a plurality of parity packets which correspond to the corresponding block.

Further, the loss correction decoding unit 132 instructs the processing time measurement unit 133 to start the processing time measurement at the time of starting the loss correction decoding process for a certain block. The loss correction decoding unit 132 instructs the processing time measurement unit 133 to end the processing time measurement at the time when the recovered data packet is input to the data output unit 135 and the data output unit 135 has recorded data of the data packet of the corresponding block in the storage unit 136.

When an unrecoverable data packet is present, the loss correction decoding unit 132 asks the retransmission control unit 134 to request retransmission of the parity packet used for recovering the unrecoverable data packet. For example, in a case where the parity packets A and B are utilized for recovering the data packet #1, when the parity packet B is lost on the transmission path, the data packet #1 becomes unrecoverable. In this case, the loss correction decoding unit 132 asks the retransmission control unit 134 to request retransmission of at least the parity packet B. The retransmission control unit 134 asked to request the retransmission requests the information processing apparatus 110 of the transmission side to retransmit the parity packet used for recovering the unrecoverable data packet.

The retransmitted parity packet is received by the communication unit 131 and is input to the loss correction decoding unit 132. The loss correction decoding unit 132 recovers the data packet which was not recoverable using the retransmitted parity packet and the parity packet received before the retransmission. Such a retransmission control is repeatedly executed until all the data packets of a certain block are recovered.

Further, in a case where the retransmission control is performed when the data packets of a certain block is recovered, the processing time information measured by the processing time measurement unit 133 and the information indicating the data amount of the recovered data are included in a first retransmission request.

The loss correction decoding unit 132 inputs the recovered data packet to the data output unit 135 every time when the data packet is recovered. The data output unit 135 records the recovered data packet in the storage unit 136.

Data of a single block is stored in a memory such as a RAM 902 in data unit (segment) which is larger than the data packet and smaller than the block. When a segment is fully filled with data, the data output unit 135 writes the segment in the file. When a segment is not fully filled with data, data remains in the memory without being written into the file. In this case, the retransmission control is performed.

When all the data packets corresponding to a single block are recovered, the loss correction decoding unit 132 asks the communication unit 131 to transmit the transmission confirmation. The communication unit 131, upon being asked to request the transmission, transmits the transmission confirmation to the information processing apparatus 110 of the transmission side. In a case where the retransmission request was not transmitted, the processing time information measured by the processing time measurement unit 133 and the information indicating the data amount of the recovered data are included in the transmission confirmation.

The function of the information processing apparatus 130 of the reception side has been described.

(Data Transmission Method Using RPS as Well as UDP)

Subsequently, an RPS code is cited as an example of the loss correction code and a data transmission method in which the RPS-encoded application data is transmitted according to the UDP will be described.

Figure 7:
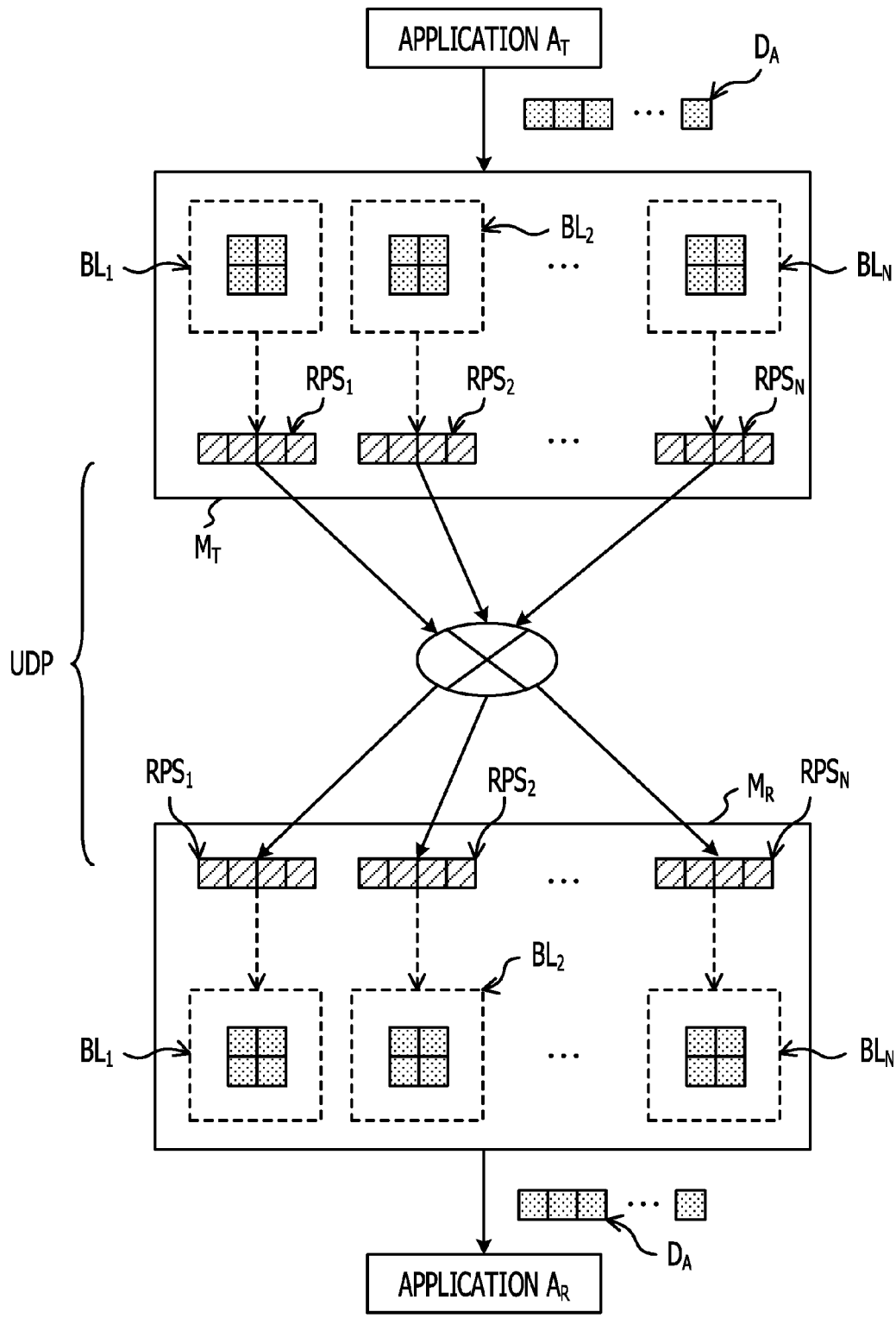
FIG. 7 is a view explaining an application data transmission method using an RPS code and a UDP.

First of all, an application data transmission method using the RPS code and the UDP will be described with reference to FIG. 7. FIG. 7 is a view explaining an application data transmission method using the RPS code and the UDP. The example of FIG. 7 illustrates a transmission process in which data $D_A$ is transmitted from an application software $A_T$ of the transmission side to an application software $A_R$ of the reception side.

Data $D_A$ output from the application software $A_T$ are distributed to be allocated to a plurality of blocks $BL_1, \ldots, BL_N$ by the middleware $M_T$. In the meantime, the middleware $M_T$ is software that runs on the information processing apparatus 110 of the transmission side. The middleware $M_T$ packetizes and RPS-encodes data allocated to the block $BL_1$ to generate an RPS code $RPS_1$. Similarly, the middleware $M_T$ generates the RPS codes $RPS_2, \ldots, RPS_N$ that correspond to the respective blocks $BL_2, \ldots, BL_N$. Further, the RPS codes $RPS_1, \ldots, RPS_N$ are an example of the parity packet.

The RPS codes $RPS_1, \ldots, RPS_N$ are transmitted to the middleware $M_T$ that runs on the information processing apparatus 130 of the reception side according to the UDP. The middleware $M_R$ RPS-decodes the RPS code $RPS_1$ to recover the data allocated to the $BL_1$. Similarly, the middleware $M_R$ recovers data allocated to the respective blocks $BL_2, \ldots, BL_N$. Also, the middleware $M_R$ combines and recovers data allocated to the blocks $BL_1, \ldots, BL_N$ to input the recovered data to the application software $A_R$.

The application data transmission method using the RPS code and the UDP has been described. As described above, data is transmitted according to the UDP and thus, throughput may be enhanced as much as the frequency of the transmission confirmation may be suppressed. Further, data is RPS-encoded and thus, data may be recovered even when some of the RPS codes are lost on the transmission path. Therefore, data transmission reliability is enhanced. Further, the RPS code having excellent loss correction capability is applied and thus, the frequency of retransmission request is decreased and throughput is further enhanced.

Figure 8:
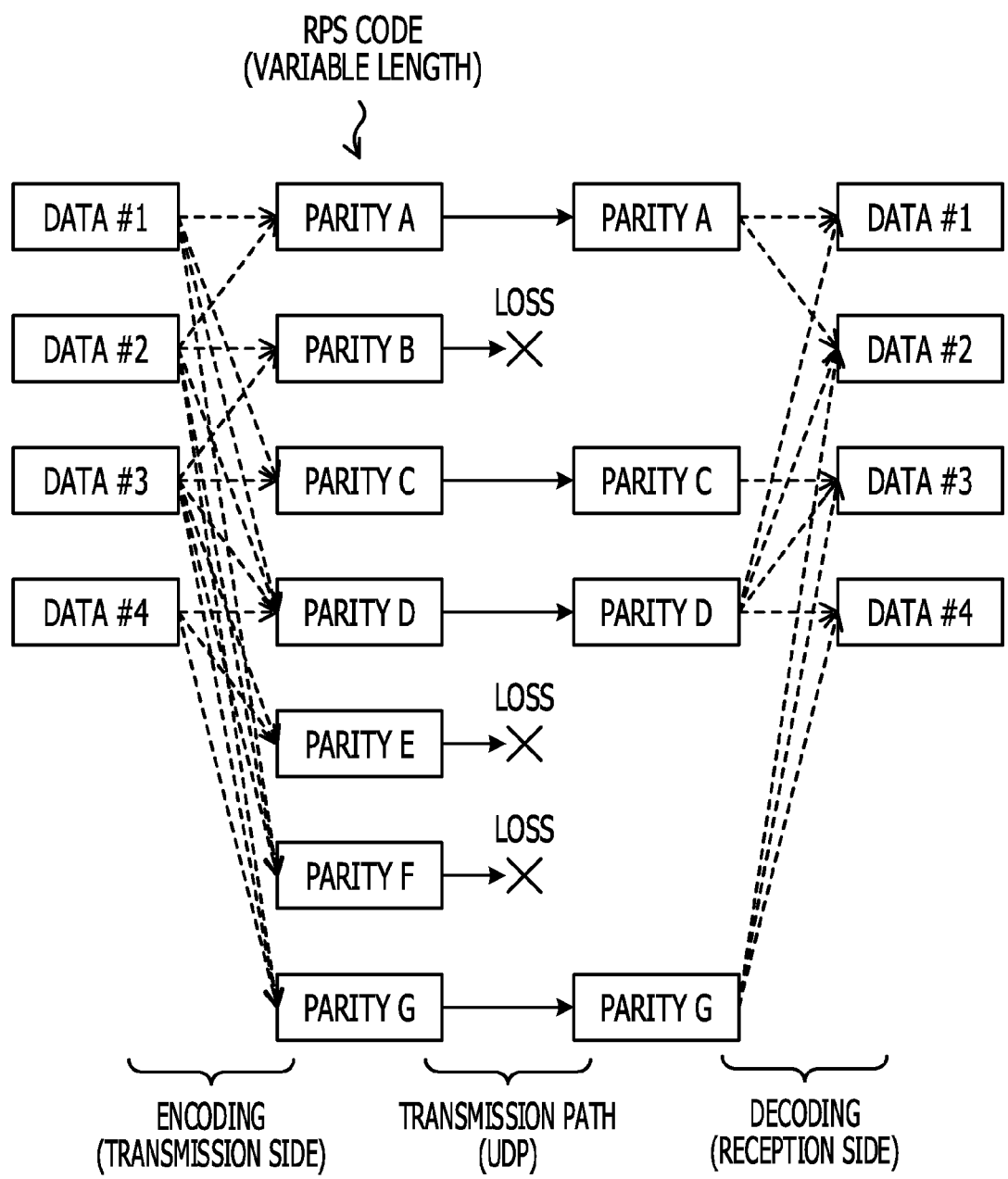
FIG. 8 is a view explaining an RPS encoding process and an RPS decoding process.

Here, a specific example of an RPS encoding process and an RPS decoding process are described with reference to FIG. 8. FIG. 8 is a view explaining the RPS encoding process and the RPS decoding process. The example of FIG. 8A illustrates a process in which the data packets #1~#4 are RPS-encoded to be transmitted and the data packets #1~#4 are RPS-decoded to be recovered.

A plurality of the data packets to be transmitted are combined and thus, all the data packets are converted into a plurality of parity packets in the RPS encoding scheme as illustrated in FIG. 8. The combination of the data packets used for generating each parity packet is set in such a manner that the possibility of recovering all the data packets for the parity packet loss becomes high. For example, the combination of the data packets is determined by a simulation.

Further, the number of the parity packets generated by the RPS encoding for a predetermined number of the data packets may be arbitrarily changed. Therefore, it becomes possible to flexibly respond to a situation such as, for example, when a transmission path having a high packet loss ratio is used, when the number of parity packets is increased, otherwise when a transmission path having a low packet loss ratio is used, and when the number of parity packets is decreased.

In the example of FIG. 8, the parity packet A is generated using the data packets #1 and #2 and the parity packet B is generated using the data packets #2 and #3. Further, the parity packet C is generated using the data packets #1 and #3 and the parity packet D is generated using the data packets #1, #2, #3 and #4. Further, the parity packet E is generated using the data packets #3 and #4, the parity packet F is generated using the data packets #1, #2 and #3 and the parity packet G is generated using the data packets #2, #3 and #4. As such, each parity packet is generated using a plurality of the data packets.

As illustrated in FIG. 8, the parity packets A~G are transmitted according to the UDP. When some parity packets B, E and F are lost on the transmission path, the data packet #1 is recovered using the parity packets A and D, and the data packet #2 is recovered using the parity packets A, D and G. Further, the data packet #3 is recovered using the parity packets C, D and G and the data packet #4 is recovered using the parity packets D and G. In the example of FIG. 8, the parity packets B, E and F are lost on the transmission path, but all the data packets #1~#4 are recovered. As such, when the combination of the parity packets used for recovering each data packet is appropriate, each data packet may be correctly recovered even when the some parity packets are lost on the transmission path.

Figure 9:
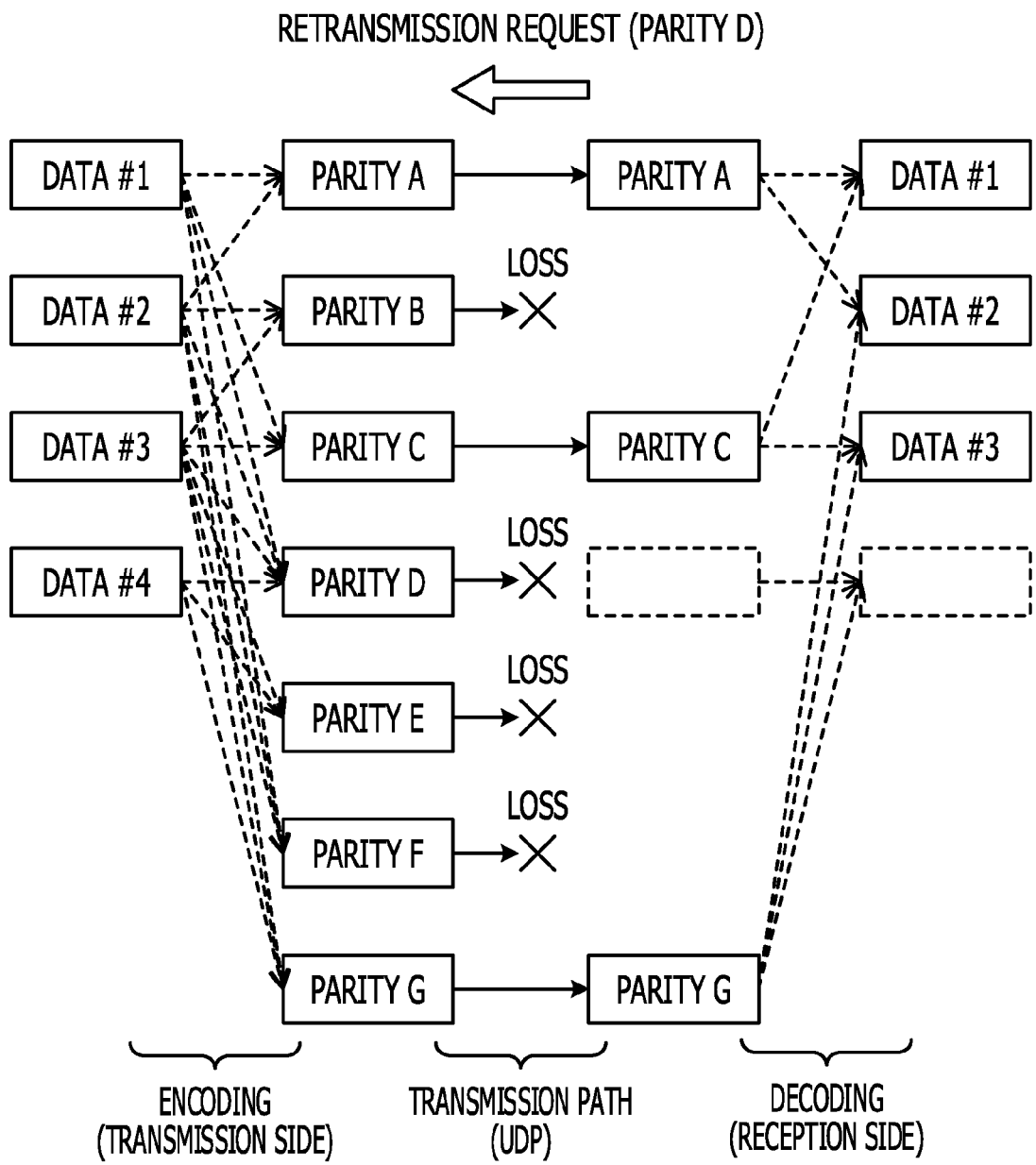
FIG. 9 is a view explaining a retransmission control method in a data transmission method using the RPS code and the UDP.

The RPS code is a code having a high loss correction capability, but some data packets become unrecoverable when many data packets are lost on the transmission path. For example, as illustrated in FIG. 9, when the parity packets B, D, E and F are lost, the data packet #4 becomes unrecoverable. In this case, the retransmission control of the parity packets used for recovering the data packet #4 is performed. FIG. 9 is a view explaining a retransmission control method in a data transmission method using the RPS code and the UDP.

The data packet #4 may be recovered, for example, when the parity packets D and G are present. That is, when the parity packet D is retransmitted, the data packet #4 may be recovered. Therefore, retransmission of the parity packet D is requested in the example of FIG. 9.

However, the data packet #4 may also be recovered with a combination of the parity packets E and G and thus, retransmission of the parity packet E may be requested. As such, there may be a case where the parity packet requested for retransmission may be selected.

When the parity packet requested for retransmission may be selected, the combination of the parity packets to be retransmitted may be selected in such a manner that the number of the parity packets to be retransmitted is further decreased. For example, when there is a parity packet X which is able to decode two data packets and a parity packet Y which is able to decode four data packets, retransmission of the parity packet Y may be requested. The parity packet is selected in such a method and thus, all the data packets may be efficiently recovered.

As described above, the number of parity packets used for transmitting a predetermined number of the data packets may be arbitrarily changed in the RPS encoding. Therefore, for example, an adjustment may be made in such a manner that the number of parity packets is decreased on the transmission path having a low packet loss ratio and the number of parity packets is increased on the transmission path having a high packet loss ratio.

Further, the number of data to be allocated to each block according to, for example, a processing load of reception side or a communication environment may be adjusted without changing the number of parity packets corresponding to each block. With performing such an adjustment, for example, it is possible to avoid a situation where a buffer used in the application layer of the reception side is overflowed. Hereinafter, such a method will be described.

(Transmission Control Method)

Figure 10:
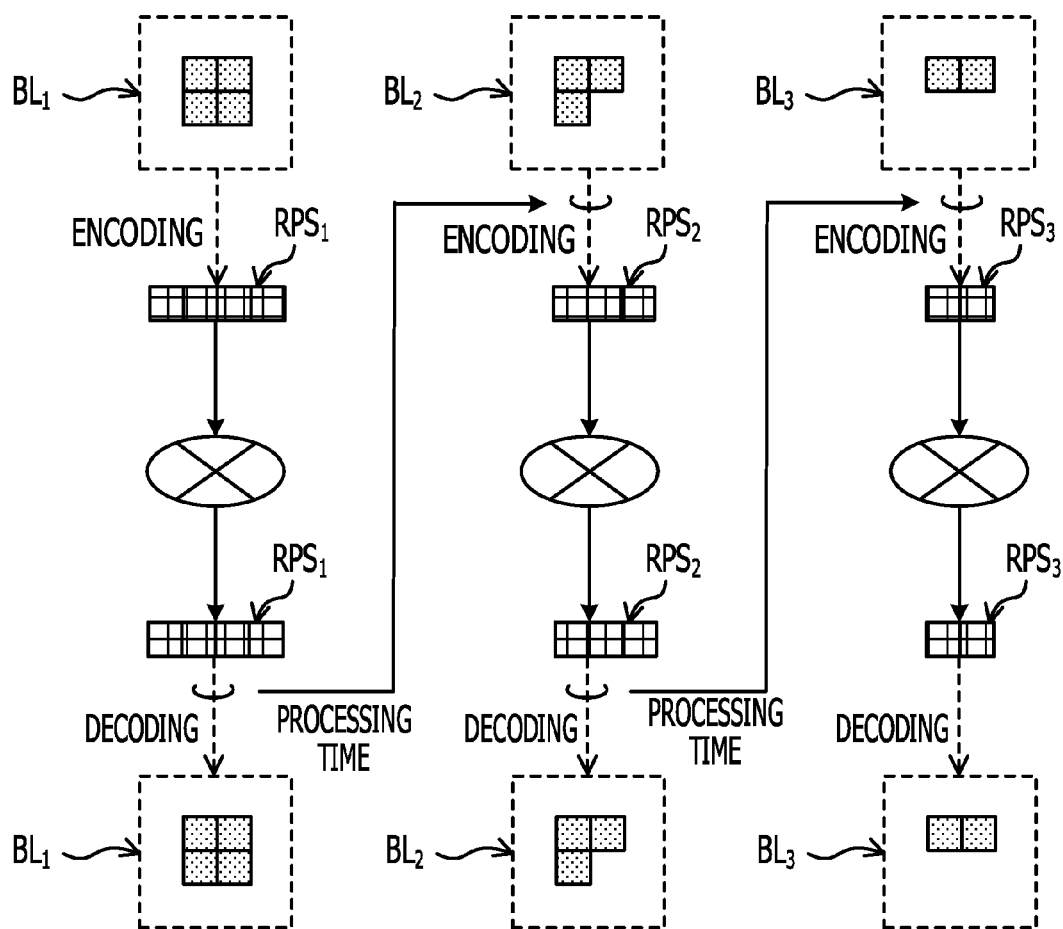
FIG. 10 is a first view explaining a transmission control method according to the second embodiment.

FIG. 10 is a first view explaining a transmission control method according to the second embodiment. In the example of FIG. 10, data allocated to the blocks $BL_1$, $BL_2$ and $BL_3$ are sequentially transmitted. First of all, data allocated to the block $BL_1$ is RPS-encoded to generate the RPS code $RPS_1$ formed with a plurality of parity packets. The RPS code $RPS_1$ is transmitted according to the UDP.

The received RPS code $RPS_1$ is recovered into data corresponding to the block $BL_1$ in the reception side. In this case, a time taken from the start of the RPS decoding to writing of the decoded data into a file is measured and the measured time is notified to the transmission side. For example, the processing time information is included in the transmission confirmation to be transmitted to the transmission side.

When the processing time taken during recovery of data allocated to block $BL_1$ is relatively long, the amount (block size) of data to be allocated to block $BL_2$ is made smaller. The data allocated to block $BL_2$ is converted into the RPS code $RPS_2$ to be transmitted to the reception side. In the reception side, data allocated to the block $BL_2$ is recovered from the RPS code $RPS_2$. In this case, the time taken from the start of the RPS decoding to writing of the decoded data into a file is measured and the measured time is notified to the transmission side.

When the processing time taken during the recovery of data allocated to block $BL_2$ is still relatively long, the data amount to be allocated to block $BL_3$ is made smaller. The data allocated to block $BL_3$ is converted into the RPS code $RPS_3$ to be transmitted to the reception side. In the reception side, data allocated to the block $BL_3$ is recovered from the RPS code $RPS_3$. Further, when the processing time is relatively short, the data amount to be allocated to each block is made larger in contrary to the example of FIG. 10.

As described above, when the processing time at the reception side is relatively long, the data amount to be allocated to a single block is decreased and thus, the data amount to recover is decreased and the processing load is reduced. Further, the data amount to recover for each block is decreased and thus, it is possible to avoid a situation where the buffer used in the application layer of the reception side is overflowed.

Figure 11:
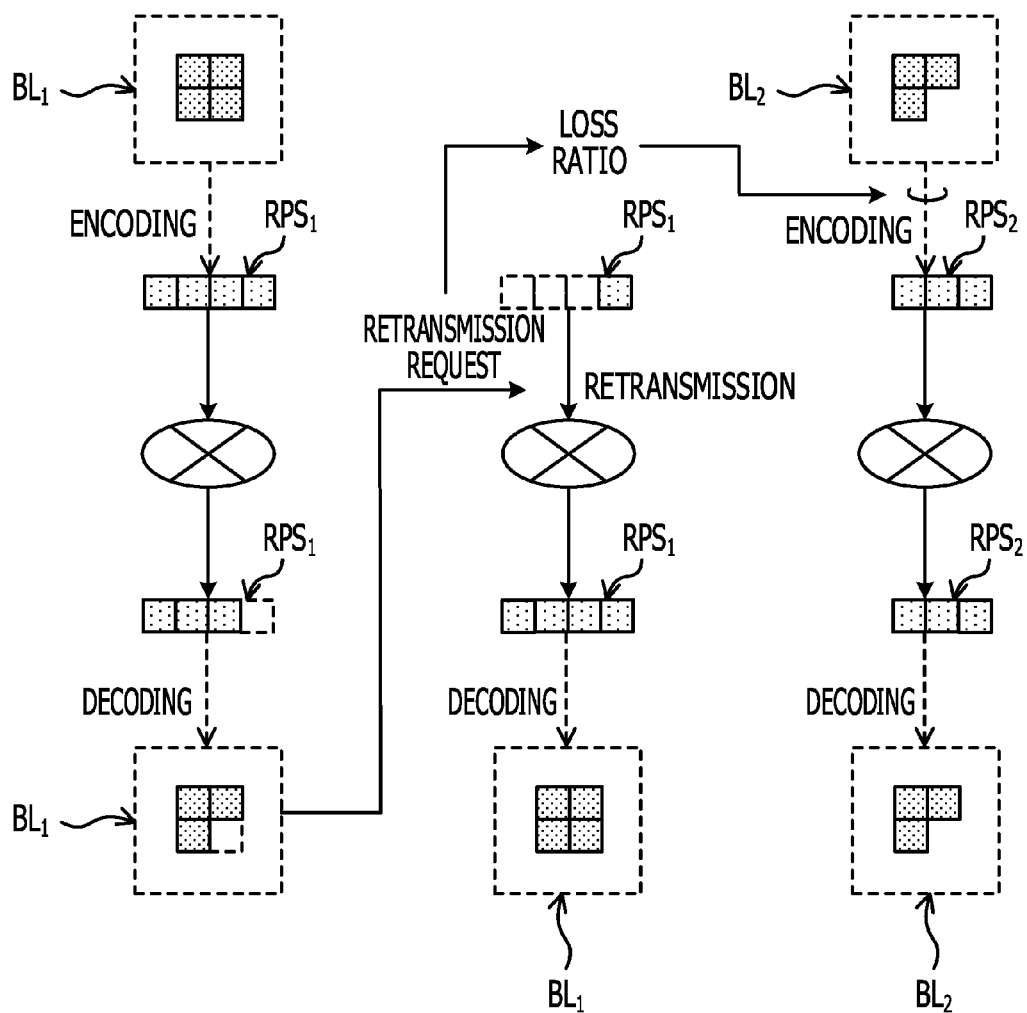
FIG. 11 is a second view explaining the transmission control method according to the second embodiment.

When some data packets become undecodable, the retransmission control is performed as illustrated in FIG. 11. FIG. 11 is a second view explaining the transmission control method according to the second embodiment.

For example, when some of the RPS code $RPS_1$ generated from the data allocated to the block $BL_1$ are lost on the transmission path and some data packets are unrecoverable at the reception side, the retransmission of the parity packet used for recovering the data packet which was unrecoverable state is requested. In this case, information used for calculating the packet loss ratio is included in the retransmission request to be notified to the transmission side from the reception side. According to this request, the parity packet is retransmitted and the data packet which was unrecoverable is recovered using the retransmitted parity packet.

Further, information included in the retransmission request to be transmitted includes information which indicates the number of the data packets that were recoverable before the retransmission request. When using such information, a ratio of the data packets which was unrecoverable at the time of the first retransmission among the data packets corresponding to the block $BL_1$ may be calculated. That is, the packet loss ratio may be calculated.

The packet loss ratio described above is used for determining the amount of data to be allocated to the block $BL_2$ to be subsequently transmitted. For example, when the packet loss ratio is high, the amount of data to be allocated to the block $BL_2$ is decreased.

Further, when it is intended to decrease the amount of data to be allocated to the block, decrement or decreasing rate is determined by considering the processing speed of the reception side. Therefore, the processing time information and information indicating the amount of data which were recoverable are also included in the retransmission request to be transmitted. When the decrement or decreasing rate is too large, the processing load of the reception side becomes too lower, and thus the operation resources are wasted and the amount of the data to be transmitted at a time is decreased, thereby causing a decrease in throughput. Therefore, the amount of data to be allocated to the block is determined in such a manner that the operation resources of the reception side are fully utilized within a range in which the buffer utilized in the application layer of the reception side is not overflowed.

As described above, the packet loss ratio in addition to the processing speed is also considered such that the occurrence frequency of the retransmission control may be reduced while considering the processing load of the reception side. As a result, further enhancement of the throughput may be expected. Further, the settings are changed dynamically according to the processing speed and the packet loss ratio and thus, data may be transmitted using desirable settings according to the processing load condition and the transmission path situation that change with time. Therefore, a high throughput may be stably maintained.

Figure 12:
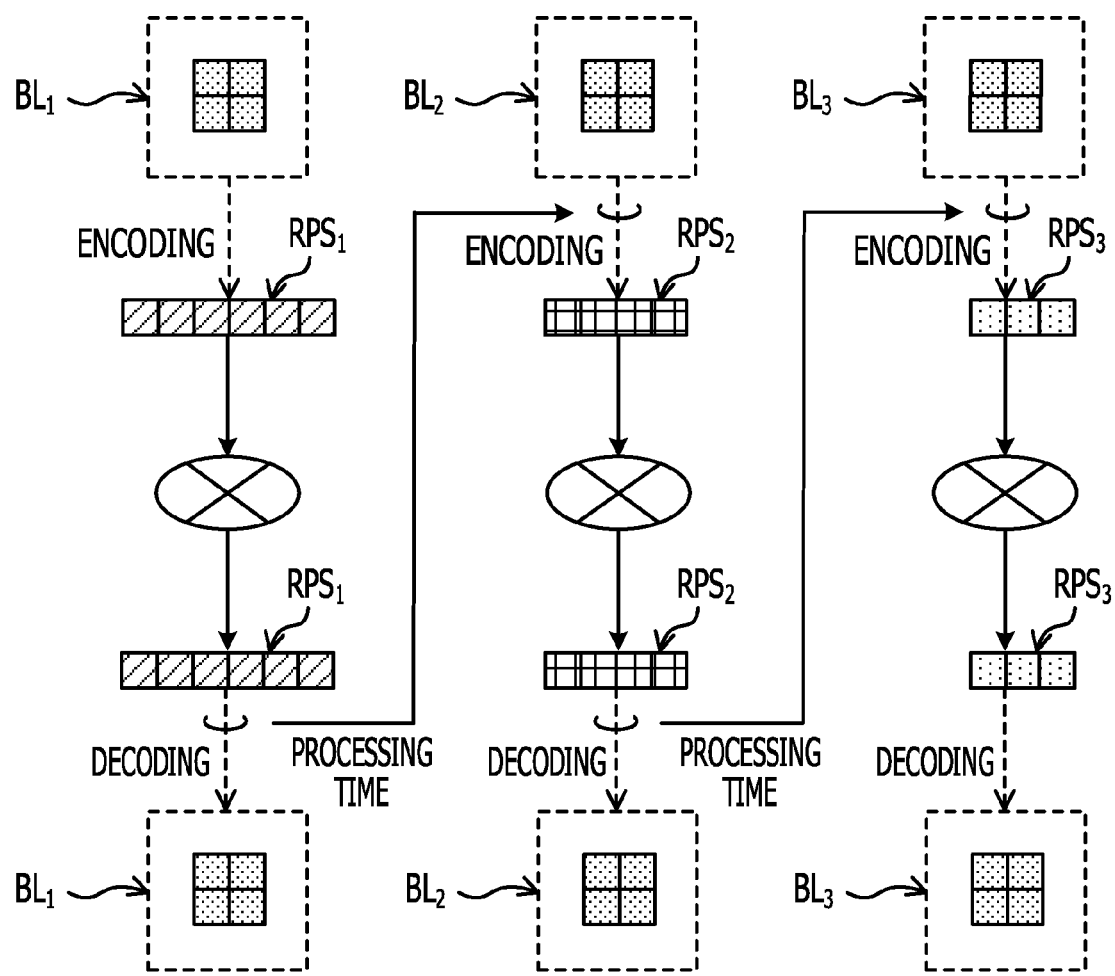
FIG. 12 is a third view explaining the transmission control method according to the second embodiment.

Hereinbelow, a modified example of a transmission control method in which an encoding rate is adjusted according to, for example, the processing speed will be described. FIG. 12 is a third view explaining the transmission control method according to the second embodiment.

In an example of FIG. 12, data allocated to the blocks $BL_1$, $BL_2$, $BL_3$ are sequentially transmitted. First of all, data allocated to the block $BL_1$ are RPS-encoded to generate the RPS code $RPS_1$ formed with a plurality of the parity packets. The RPS code $RPS_1$ is transmitted according to the UDP. Further, the received RPS code RPS1 is recovered into data corresponding to the block $BL_1$. In this case, the processing time taken from the start of the RPS decoding to the writing of the decoded data into the file is measured and notified to the transmission side. For example, the processing time information is included in the transmission confirmation to be transmitted to the transmission side.

In a case where the processing time taken to recover data allocated to block $BL_1$ is relatively long, when encoding data allocated to block $BL_2$, the number of combinations of the parity packets used for recovering each data packet is decreased. The data allocated to the block $BL_2$ is converted into the RPS code $RPS_2$ to be transmitted to the reception side. Data allocated to the block $BL_2$ is recovered from the RPS code $RPS_2$ at the reception side. In this case, a time taken for an RPS decoding is measured and the measured time is notified to the transmission side.

In a case where the processing time taken for recovery of data allocated to block $BL_2$ is still relatively long, when encoding data allocated to block $BL_3$, the number of combinations of the parity packets used for recovering each data packet is decreased. The data allocated to the block $BL_3$ is converted into the RPS code $RPS_3$ and transmitted to the reception side. Data allocated to the block $BL_3$ is recovered from the RPS code $RPS_3$ at the reception side. Further, when the processing time is short, the number of combinations of the parity packets used for recovering each data packet is decreased to enhance the loss correction capability contrary to the example of FIG. 12.

As described above, when the processing time taken for the processing load of the reception side is relatively long, the number of combinations of the parity packets used for recovering each data packet is decreased such that a situation where the decoding process is not performed in time and the processing delay is generated may be avoided. In the meantime, when the processing time is relatively short, the number of combinations of the parity packets used for recovering each data packet is increased such that a higher loss correction capability may be exhibited. In this case, the frequency of the retransmission control is decreased contributing to enhance the throughput.

Figure 13:
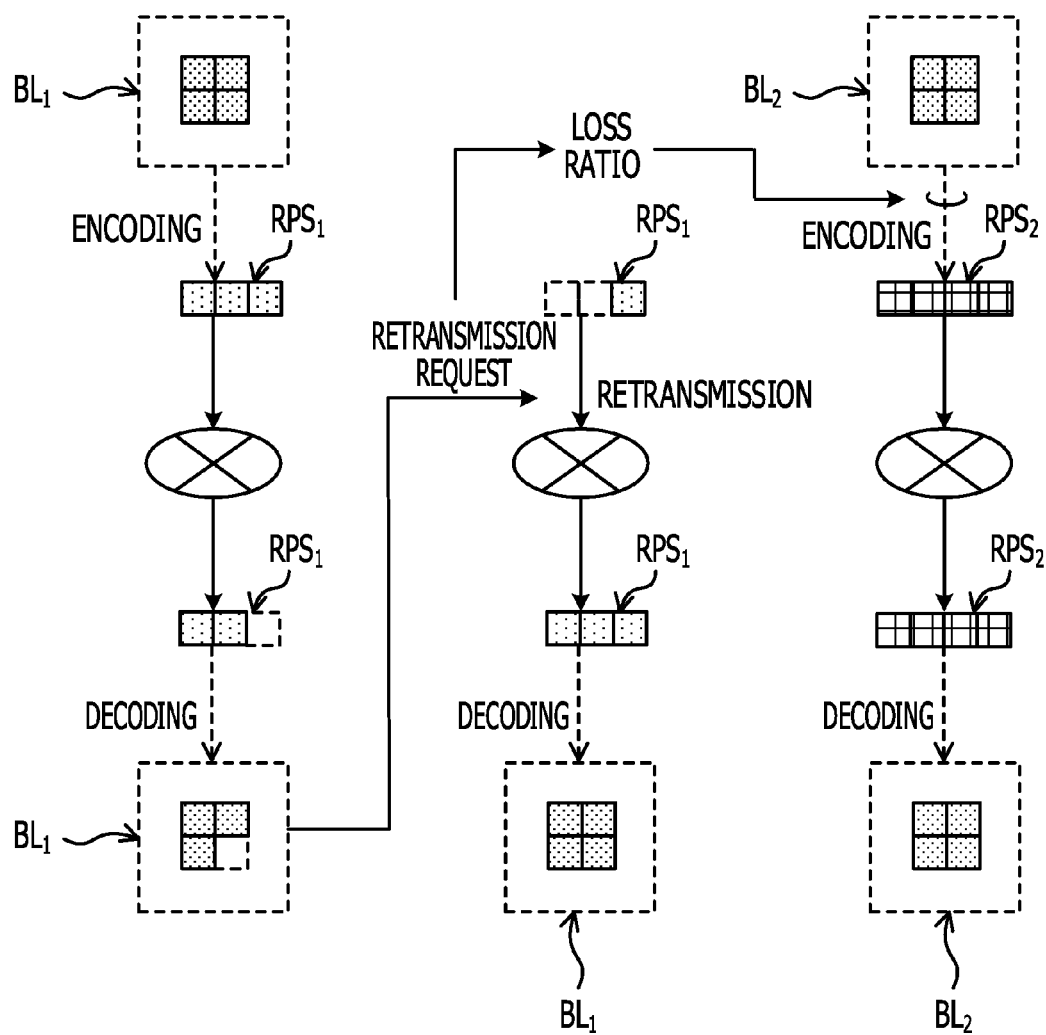
FIG. 13 is a fourth view explaining the transmission control method according to the second embodiment.

When some data packets become undecodable, the retransmission control is performed as illustrated in FIG. 13. FIG. 13 is a fourth view explaining the transmission control method according to the second embodiment. For example, when some of RPS code $RPS_1$ generated from data allocated to the block $BL_1$ are lost on the transmission path and thus some data packets become unrecoverable at the reception side, a retransmission request is made for the parity packet used for recovering the data packet that was unrecoverable. The parity packet is retransmitted according to the request and the data packet that was unrecoverable is recovered using the parity packet.

Further, information used for calculating the packet loss ratio is included in the retransmission request to be notified from the reception side to the transmission side. For example, the retransmission indicating the number of data packets that were recoverable before requesting the retransmission is notified from the reception side to the transmission side. When using the information, the ratio of the data packets that becomes unrecoverable among the data packets corresponding to the block $BL_1$ may be calculated. That is, the packet loss ratio may be calculated. The packet loss ratio calculated as described above is utilized at the time of transmitting data allocated to the block $BL_2$ to be subsequently transmitted.

When the packet loss ratio is relatively high, the number of the parity packets that forms the RPS code $RPS_2$ is increased. That is, the number of the parity packets available for recovery of each data packet is increased. The number of the parity packets available for recovery of each data packet is increased such that the resistance to the loss of the parity packet on the transmission path is improved, and thus the packet loss ratio may be reduced.

When the number of the parity packets available for recovery of each data packet is increased, the number of increased parity packets or an increasing rate is determined by considering the processing speed of the reception side. Therefore, the processing time information and information indicating the amount of data that were recoverable are included in the retransmission request to be transmitted. For example, in a situation where the processing speed is relatively fast, the number of increased parity packets or an increasing rate is set to be larger to an extent that the retransmission is almost not generated. In a situation where the processing speed is relatively slow, the number of increased parity packets or the increasing rate is set to be smaller by allowing a certain level of retransmission.

As described above, the packet loss ratio is also considered in addition to the processing speed such that the occurrence frequency of the retransmission control may be reduced while considering the processing load of the reception side. As a result, the throughput may be further enhanced. Further, the settings may be changed dynamically according to the processing speed and the packet loss ratio and thus, data may be transmitted using desirable settings according to the processing load condition and the situation of the transmission path that change with time. Therefore, a high throughput may be stably maintained.

(Checkpoint Data and ACK Transmission)

Figure 14:
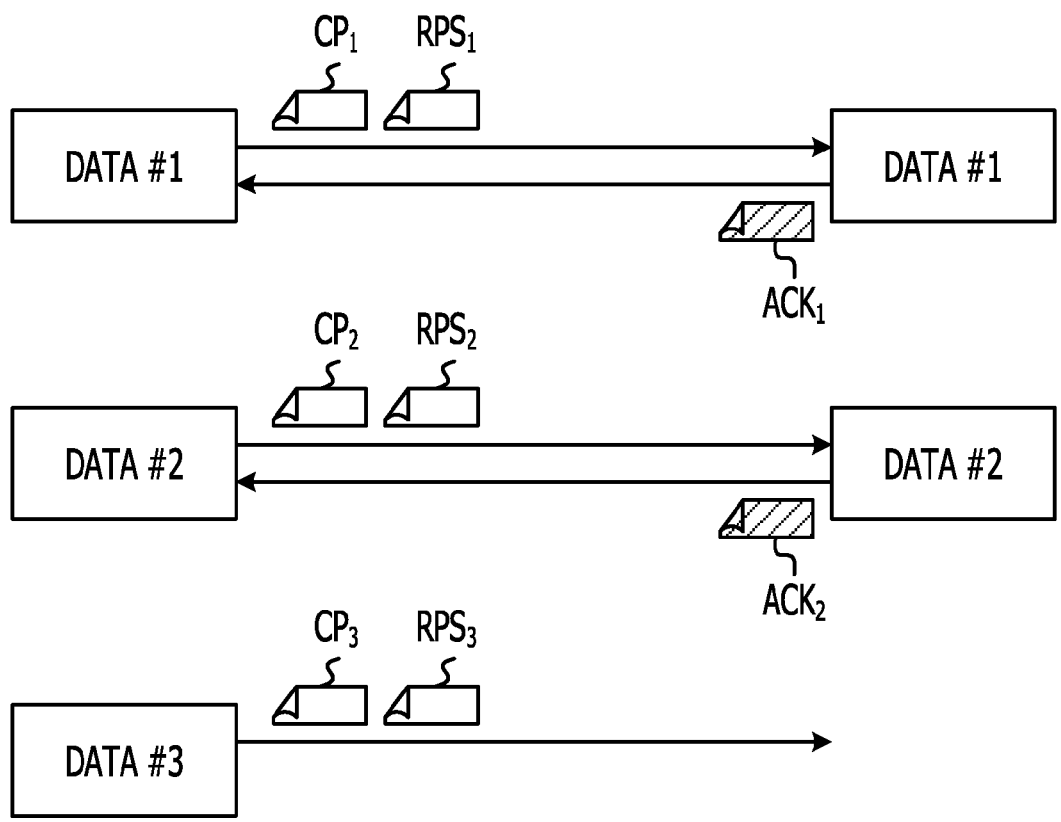
FIG. 14 is a view explaining a transmission process of a checkpoint data and an ACK according to the second embodiment.

Here, a supplementary description will be made on the RPS code transmission process and the transmission confirmation reply-returning process with reference to FIG. 14. FIG. 14 is a view explaining a transmission process of checkpoint data and an ACK according to the second embodiment.

As described above, data allocated to each block is encoded into the RPS code to be transmitted to the reception side. In the example of FIG. 14, data #1 allocated to a certain block is converted into the RPS code $RPS_1$ to be transmitted to the reception side. In this case, a checkpoint data $CP_1$ is transmitted after the RPS code $RPS_1$. The checkpoint data $CP_1$ includes information which indicates the data amount of data transmitted using the RPS code $RPS_1$. Therefore, the data amount recovered from the RPS code $RPS_1$ is compared with the data amount indicated by the information included in the checkpoint data $CP_1$ at the reception side and thus, it may be confirmed as to whether all of data allocated to the block are recovered at the reception side.

When all of data allocated to the block are recovered, the transmission confirmation $ACK_1$ is transmitted from the reception side to the transmission side. The transmission confirmation $ACK_1$ includes information of the processing time including at least a time taken for the decoding process and a time taken for recording the recovered data in the storage unit. Further, the transmission confirmation $ACK_1$ includes information indicating the data amount of the recovered data. Additionally, the transmission confirmation $ACK_1$ may include information indicating a time taken for receiving the parity packet and a time spanning from a timing at which the first parity packet is received to a timing at which the transmission confirmation $ACK_1$ is transmitted.

When the transmission confirmation $ACK_1$ including the information is obtained, a processing speed which indicates a processing time per unit data amount and the RTT calculated by subtracting the processing time from a time taken from the start of the data #1 transmission to the reception of the transmission confirmation $ACK_1$ may be calculated. Further, when information indicating the number of the data packets that were recoverable before the first retransmission control is performed is included in the transmission confirmation $ACK_1$, the packet loss ratio may be calculated using the information.

Transmission settings for data #2 to be subsequently transmitted is determined according to, for example, the processing speed or the packet loss ratio calculated as described above. That is, the data amount of data #2 to be allocated to the next block and the number of the parity packets which form the RPS code $RPS_2$ used for transmitting the data #2 are changed according to, for example, the processing speed or the packet loss ratio.

Data #2 is also converted into the RPS code $RPS_2$ to be transmitted from the transmission side to the reception side similarly to the data #1. Also, in this case, the checkpoint data $CP_2$ along with the RPS code $RPS_2$ are transmitted from the transmission side to the reception side. Also, when the data #2 is recovered at the reception side, the transmission confirmation $ACK_2$ is transmitted from the reception side to the transmission side.

The transmission confirmation $ACK_2$ also includes information such as the processing time similarly to the transmission confirmation $ACK_1$. When the transmission confirmation $ACK_2$ is obtained, for example, the processing speed or the packet loss ratio is calculated and thus, a transmission setting for the data #3 to be subsequently transmitted is determined. As such, the transmission settings are changed according to the transmission path situation or the load condition of the reception side each time when data allocated to each block is transmitted.

The RPS code transmission process and the transmission confirmation reply-returning process described above are applied such that data is transmitted using the transmission settings appropriate for the situation of the transmission path or the load condition of the reception side that change with time. Accordingly, it becomes possible to stably implement a high throughput.

Figure 15:
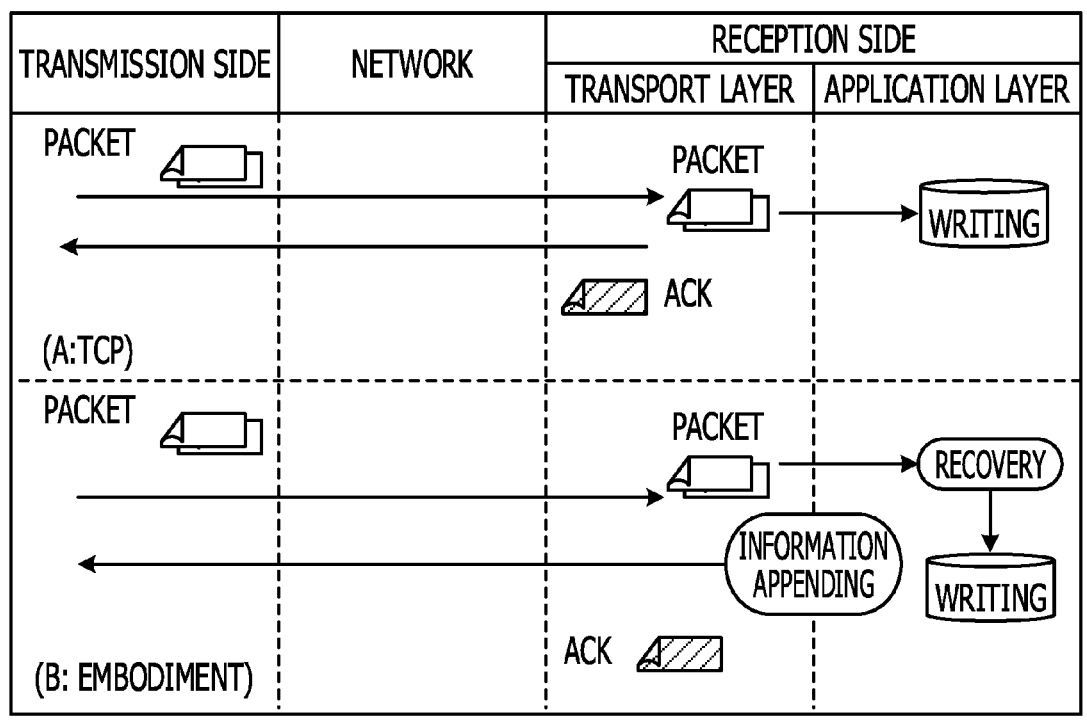
FIG. 15 is a view illustrating a comparison of an ACK transmission method relevant to a TCP with an ACK transmission method according to the second embodiment.

Next, a supplementary description will be made on the ACK transmission method according to a typical TCP and the transmission confirmation transmission method according to the second embodiment with reference to FIG. 15. FIG. 15 is a view illustrating a comparison of an ACK transmission method according to the TCP with the transmission confirmation transmission method according to the second embodiment.

In a case of the TCP as illustrated in (A) of FIG. 15, when the packet transmitted from the transmission side to the reception side is received in the transport layer of the reception side, the ACK indicating that the reception is completed is replied from the reception side to the transmission side by the processing of the transport layer. Further, data of the packet received in the transport layer is written into a file by the processing of the application layer.

In the meantime, in a case of the method according to the second embodiment as illustrated in (B) of FIG. 15, the packet (parity packet) transmitted from the transmission side to the reception side is recovered into the data packet and data of the recovered data packet is written into a file by the processing of the application layer. In the meantime, the data packet recovery process includes, for example, an alignment for the packets arrived with being out of order in addition to the RPS decoding. Information indicating the processing time or the data amount of the data that were recoverable is added to the transmission confirmation and then, the transmission confirmation to which the information is added is transmitted from the reception side to the transmission side by the function of the transport layer.

Further, when the retransmission control is performed, in the method according to the second embodiment, information that indicates the processing time spanning from the start of the RPS decoding to writing of the recovered data into the file and information indicating the data amount of the recovered data are appended to the retransmission request at the reception side to be transmitted to the transmission side.

(Processing Time Measurement Method)

Figure 16:
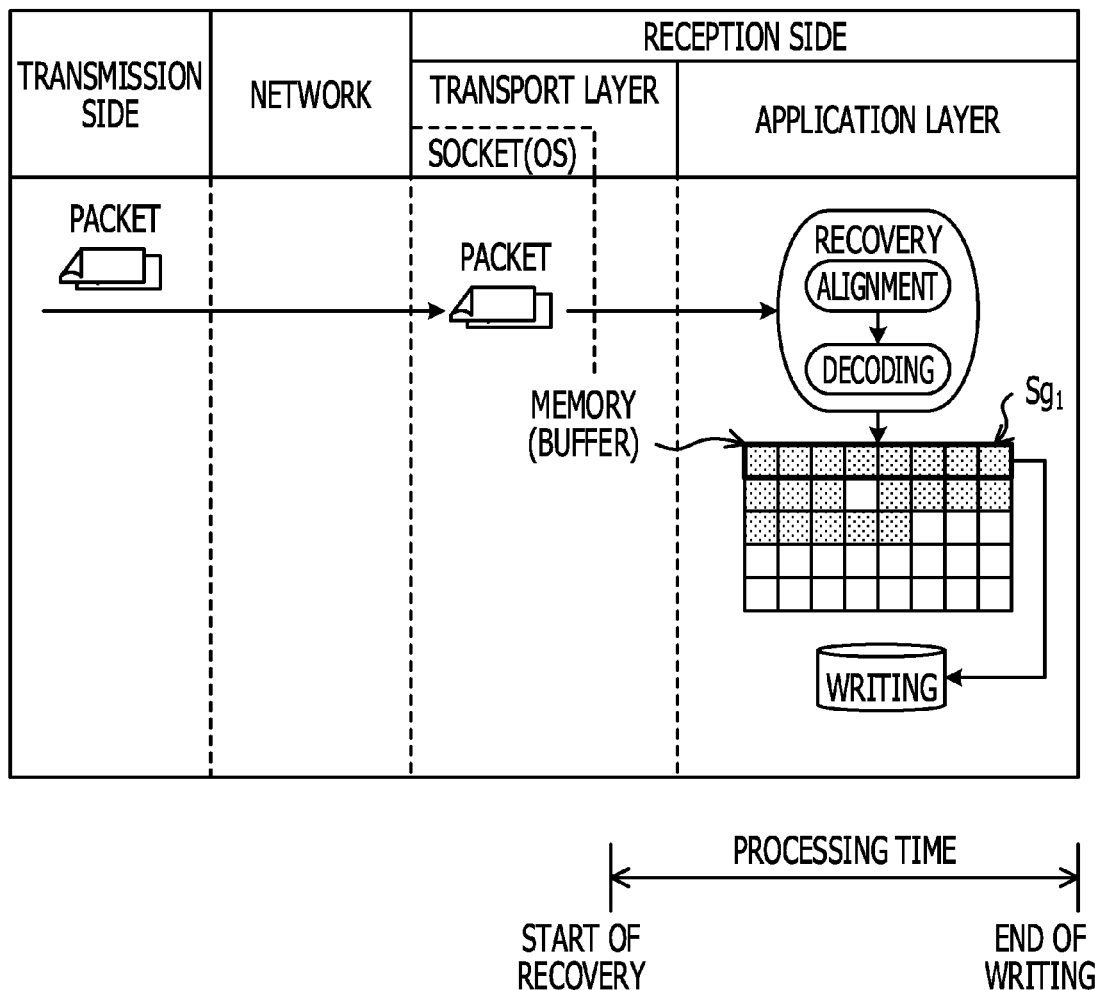
FIG. 16 is a view explaining a processing time according to the second embodiment.

A supplementary description will be made on the processing time measurement method with reference to FIG. 16. FIG. 16 is a view explaining a processing time according to the second embodiment.

As illustrated in FIG. 16, the packet (parity packet) is transmitted from the transmission side to the reception side and processed in the transport layer of the reception side. The parity packet is processed in a socket layer located at the top of the transport layer to be transmitted to the application layer. The processing time measurement starts at the timing when the decoding process for the parity packet transmitted to the application layer for a certain block is started.

In the application layer, an alignment of the packets of which orders are changed on the transmission path and the RPS decoding process are further executed and the recovered data are written into the file. Data of a single block is stored in the memory (buffer of the application layer) such as the RAM 902 in a unit of storage (segment) which is larger than the data packet and smaller than the block. When a segment $Sg_1$ is completely filled with data, the segment $Sg_1$ is written into the file. The measurement of the processing time is ended at the time when writing of data into the file is completed. Further, a segment not completely filled with data is not written into the file and remains in the memory, and a retransmission control is performed. The processing time information is used for calculating the processing speed and determining the transmission settings at the transmission side.

When the writing of data into the file is delayed, there may be a case where free space of the memory of the application layer in which the recovered data is temporarily accumulated is lack. Lack of the free space of the memory of the application layer causes congestion in the receiving process such as a case where the parity packets transmitted from the transport layer is unable to be received in the application layer. However, as described above, a time taken for transmitting data is included in the processing time such that dynamic change of transmission settings considering the situation in which writing of data into the file is delayed is performed, and thus it is possible to prevent the receiving process from being congested due to the delay in writing.

For example, when data is written in the storage device, the load condition of the storage device changes with time. Therefore, even when there are enough operation resources of the reception side, the data writing process may be congested. When the data writing process is congested, the subsequent process is delayed and thus, there is a possibility that the processing of the packets transmitted one after another from the transmission side to the reception side may not be normally performed in time. However, when the transmission settings are dynamically changed based on the processing time as described in FIG. 16, for example, a situation where the buffer of the application layer is overflowed at the reception side may be avoided and thus, a high throughput may be stably implemented.

The transmission control method according to the second embodiment has been described.

(Flow of Transmission Process)

Next, descriptions will be made on the flow of the transmission process with reference to FIG. 17 and FIG. 18. The process illustrated in FIG. 17 and FIG. 18 is executed by the information processing apparatus 110 of the transmission side.

Figure 17:
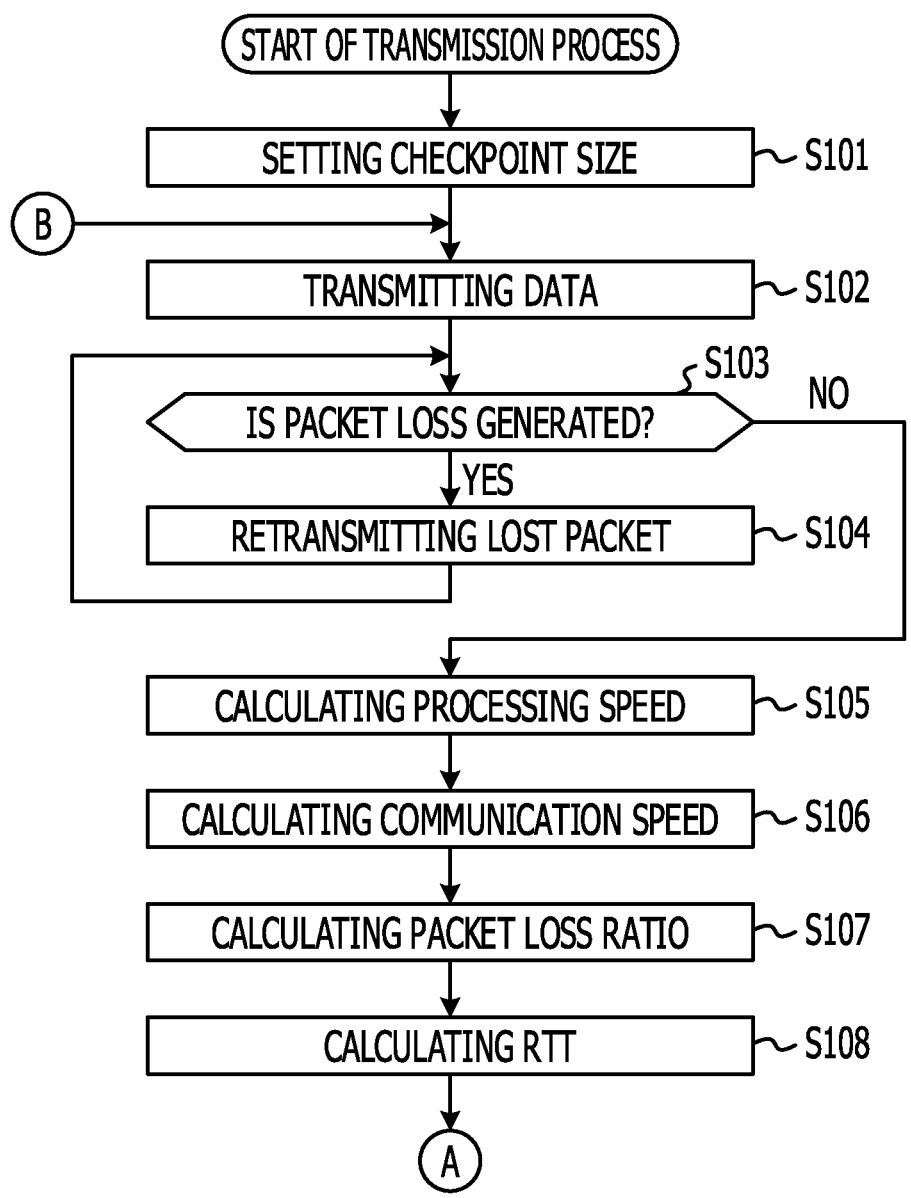
FIG. 17 is a first view explaining a flow of a transmission process according to the second embodiment.
Figure 18:
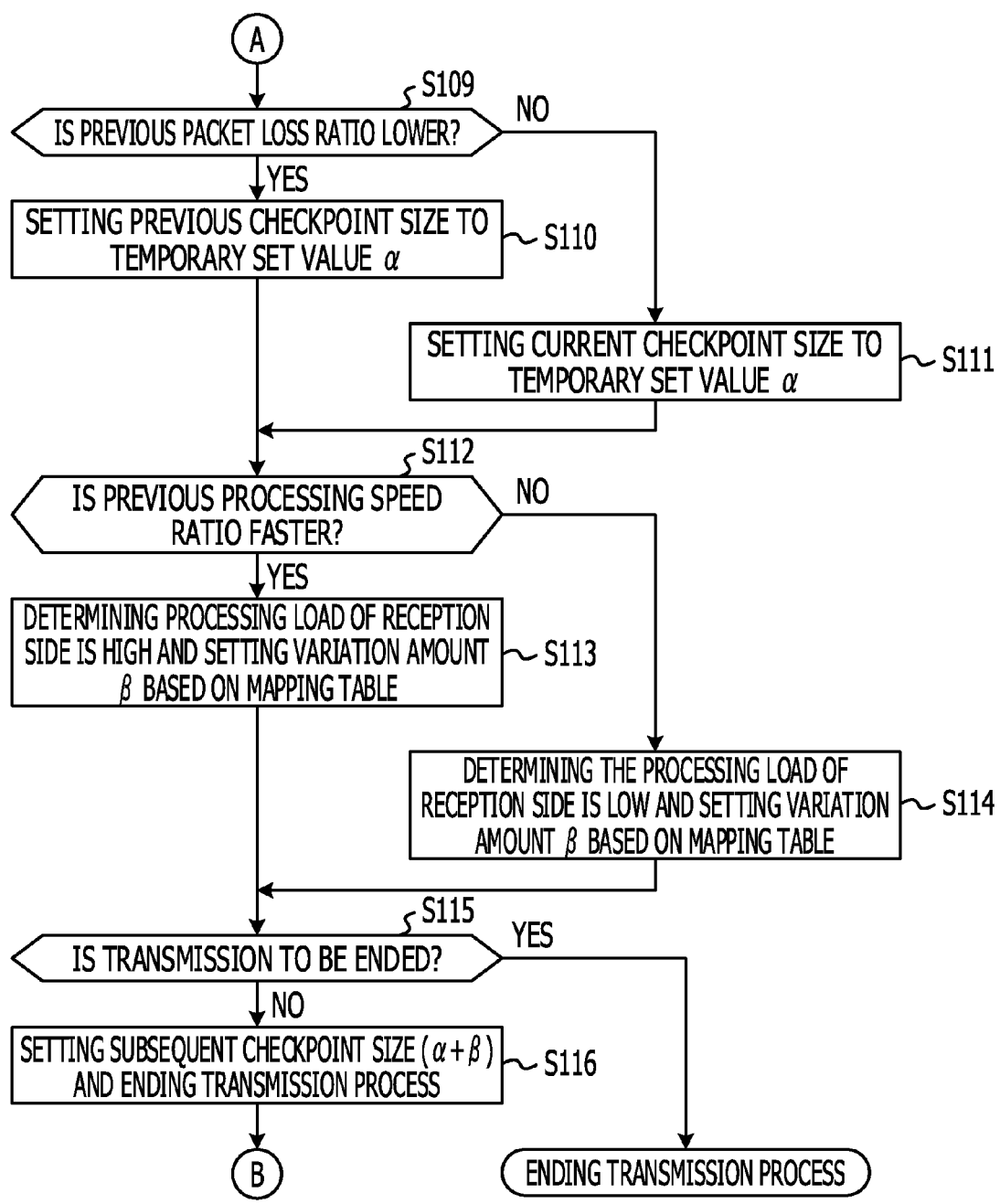
FIG. 18 is a second view explaining the flow of the transmission process according to the second embodiment.

FIG. 17 is a first view explaining the flow of a transmission process according to the second embodiment. At S101, the control unit 116 sets a checkpoint size indicating the data amount of data to be transmitted. The checkpoint size information set by the control unit 116 is input to the blocking unit 112.

At S102, the blocking unit 112 allocates the checkpoint size data to the block. The packet generating unit 113 divides data allocated to the block and appends a header thereto to generate a plurality of the data packets. The loss correction encoding unit 114 RPS-encodes the data packets to generate a plurality of parity packets. The communication unit 115 transmits the parity packet and the checkpoint sized data.

At S103, the control unit 116 confirms whether the retransmission request is received from the information processing apparatus 130 of the reception side and determines whether the packet loss is generated according to the presence or absence of the retransmission request. When the packet loss is generated (retransmission request is received), the process proceeds to S104. When the packet loss is not generated (retransmission request is not received), the process proceeds to S105.

Further, when all of data was recovered for a certain block without the retransmission control, the control unit 116 receives the transmission confirmation including the processing time information and information indicating the data amount of the recovered data. In the meantime, when the retransmission control is performed for a certain block, the control unit 116 acquires the processing time information and information indicating the data amount of the recovered data from the first retransmission request. Further, the control unit also receives the transmission confirmation transmitted when all of data are recovered.

At S104, the control unit 116 retransmits the parity packet used for recovering the data packet which is unrecoverable according to the retransmission request received from the information processing apparatus 130 of the reception side. When the processing of S104 is ended, the process proceeds to S103.

At S105, the control unit 116 calculates the processing speed indicating the data amount processed per unit time based on the processing time information or information indicating the data amount of the recovered data. Also, the control unit 116 maintains the processing speed information.

At S106, the control unit 116 calculates the communication speed based on information such as the transmission time of the parity packet or the reception time of the parity packet. At S107, the control unit 116 calculates the packet loss ratio based on the number of the data packets that was unrecoverable before performing the retransmission control and the number of the transmitted data packets. Further, the control unit 116 maintains the calculated packet loss ratio.

At S108, the control unit 116 calculates the RTT by subtracting the processing time from a time taken until the transmission confirmation is received after transmitting the parity packet. When the processing of S108 is ended, the process proceeds to S109 illustrated in FIG. 18.

FIG. 18 is a second view explaining the flow of the transmission process according to the second embodiment. At S109, the control unit 116 determines whether the packet loss ratio calculated at the time when transmitting data of the block next to before is lower than that calculated at a time when transmitting data of the current block. When it is determined that the packet loss ratio calculated at the time when transmitting data of the block next to before is lower, the process proceeds to S110. In the meantime, when the packet loss ratio calculated at the time when transmitting data of the block next to before is not lower, the process proceeds to S111.

At S110, the control unit 116 sets the checkpoint size of the block next to before to the temporary set value α. When the processing of S110 is ended, the process proceeds to S112. At S111, the control unit 116 sets the checkpoint size of the current block to the temporary set value α. When the processing of S111 is ended, the process proceeds to S112.

At S112, the control unit 116 determines whether the processing speed calculated at the time when transmitting data of the block next to before is faster than that calculated at a time when transmitting data of the current block. When it is determined that the processing speed calculated at the time when transmitting data of the block next to before is faster, the process proceeds to S113. In the meantime, when the processing speed calculated at the time when transmitting data of the block next to before is not faster, the process proceeds to S114.

At S113, the control unit 116 determines that the processing load in the information processing apparatus 130 of reception side is high and sets the amount of variation β according to the mapping table described above. Further, when the communication speed, the packet loss ratio, and the RTT of the current block are not changed largely compared to those of the block next to before, it is expected that value of the amount of variation β becomes negative (minus). When the processing of S113 is ended, the process proceeds to S115.

At S114, the control unit 116 determines that the processing load in the information processing apparatus 130 of the reception side is low and sets the amount of variation β according to the mapping table described above. Further, when the communication speed, the packet loss ratio, and the RTT of the current block are not changed largely compared to the block next to before, it is expected that the value of the amount of variation β becomes positive (plus). When the processing of S114 is ended, the process proceeds to S115.

At S115, the control unit 116 determines whether the transmission of data is to be ended. For example, the control unit 116 determines whether the transmission of data is to be ended based on the presence or absence of instruction to end by the user or the application, or the presence or absence of data to be transmitted. When it is determined that the transmission of data is not to be ended, the process proceeds to S116. In the meantime, when the transmission of data is to be ended, a series of processes according to S101~S116 are ended.

At S116, the control unit 116 sets the checkpoint size used at the time when transmitting next block to (α+β). When the processing of S116 is ended, the process proceeds to S102 of FIG. 17.

The flow of transmission process according to the second embodiment has been described.

(Reception Process Flow)

Figure 19:
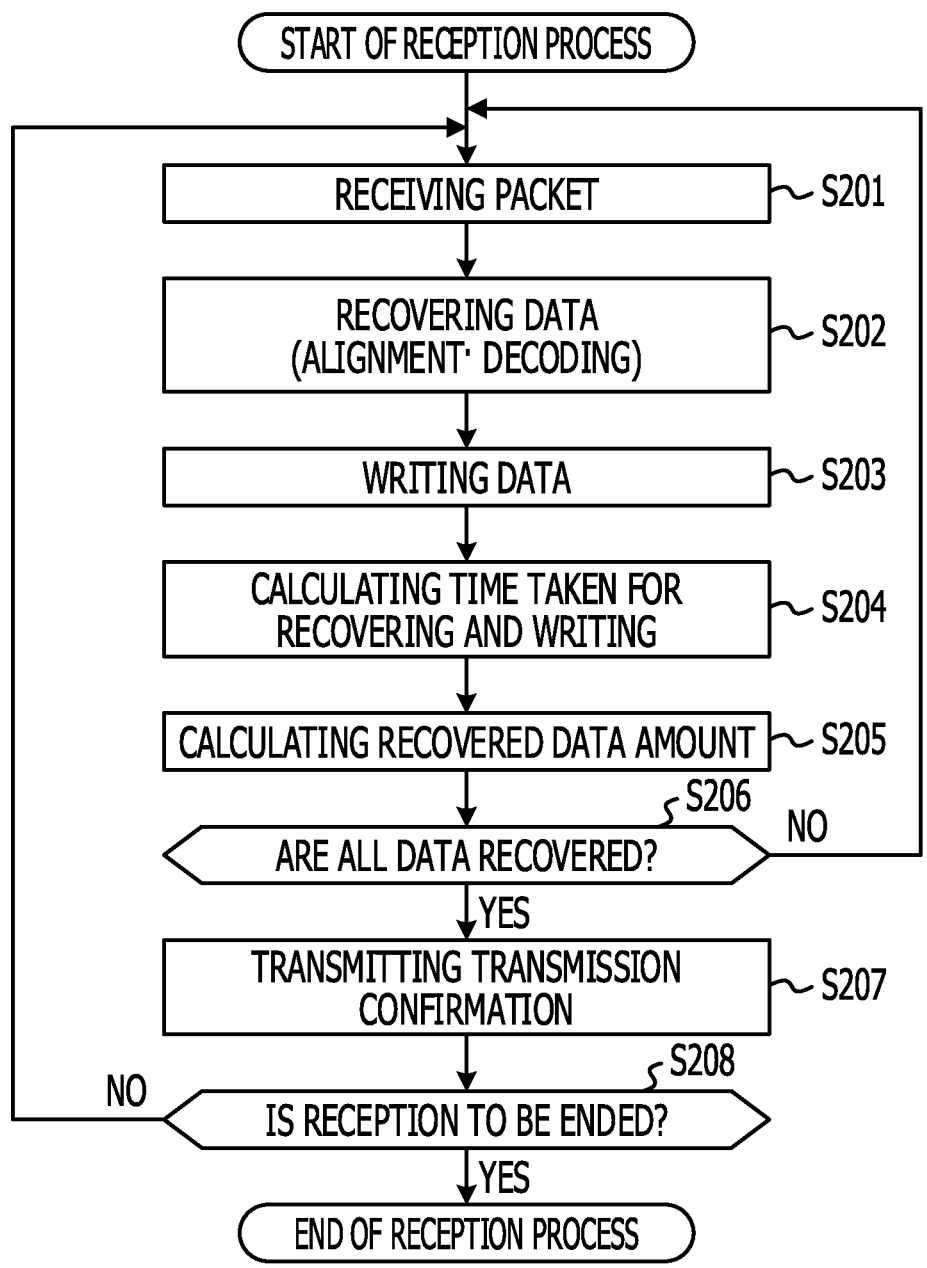
FIG. 19 is a view explaining a flow of a reception processing (sequence) according to the second embodiment.

Next, descriptions will be made on the flow of the reception process with reference to FIG. 19. The process illustrated in FIG. 19 is executed by the information processing apparatus 113 of the reception side. FIG. 19 is a view explaining the flow of a reception process according to the second embodiment.

At S201, the communication unit 131 receives the parity packet transmitted from the information processing apparatus 110 of transmission side. At S202, the loss correction decoding unit 132 performs the RPS decoding and recovers the data packet from the parity packet. In this case, when the packets are changed with being out of order on the transmission path, the packets are aligned in a transmission order. Further, the processing time measurement unit 133 starts the processing time measurement at the time when the recovery process for a single block is started.

At S203, the data output unit 135 writes the recovered data into the storage unit 136. The data output unit 135 sequentially accumulates the recovered data onto the buffer and writes a predetermined quantity of data (segment unit) in the storage unit 136 at the time when the predetermined quantity of consecutive data is gathered. However, when the predetermined quantity of data are not gathered in an unit of segment due to, such as the packet loss, data in the segment are maintained in the buffer until data are gathered in an unit of segment by, for example, the retransmission control.

At S204, the processing time measurement unit 133 ends the processing time measurement at the time when the recovered data is written into the storage unit 136 and calculates the processing time. At S205, the loss correction decoding unit 132 calculates the data amount of the recovered data.

At S206, the loss correction decoding unit 132 determines whether all the data of which data amount is indicated by the checkpoint data is recovered. When it is determined that all the data are recovered, the process proceeds to S207. When the unrecoverable data is present, the retransmission control unit 134 transmits the retransmission request to the information processing apparatus 110 of transmission side. When the retransmission request is transmitted, the process proceeds to S201.

In a case of transmitting the first retransmission request, the retransmission request includes information indicating the processing time and the data amount of the recovered data to be transmitted. When a retransmission request after the first retransmission request is transmitted, the processing S204 and S205 are skipped and a retransmission request not containing information which indicates the processing time and the data amount of the recovered data is transmitted to the information processing apparatus 110 of transmission side.

At S207, the communication unit 131 transmits the transmission confirmation to the information processing apparatus 110 of transmission side. When the retransmission control is not performed, the retransmission request containing information which indicates the processing time and the data amount of the recovered data is transmitted. In the meantime, when the retransmission control is performed, retransmission request not containing information which indicates the processing time and the data amount of the recovered data is transmitted.

At S208, when the reception of data is to be ended, a series of processes according to S201~S208 are ended. In the meantime, when it is determined that the transmission of data is not to be ended, the process proceeds to S201. For example, the receiving process is ended according to an instruction to end by the user or the application or another instruction to end received from the information processing apparatus 110 of transmission side.

The flow of the reception process according to the second embodiment has been described. As described above, when applying the technology according to the second embodiment, even when the processing load of the reception side is relatively high, it becomes possible to avoid a difficult situation where the buffer of the application layer of the reception side is overflowed due to the processing delay. Further, since a control that makes the loss correction capability relatively high, is dynamically performed in a situation where the packet loss ratio is relatively high, the frequency of retransmission request is decreased. As such, the transmission settings are dynamically changed according to the situation of the transmission path or a load condition of the reception side that change with time and thus, a high throughput may be stably maintained.

In the meantime, although description has been made on the assumption that the RPS encoding is applied to the present disclosure as an example, a method in which an error correction code such as an LDPC code or a turbo code, instead of the RPS code is applied may be considered. For example, in a case of applying the LDP code, the encoding method may be modified to have a configuration in which when the processing speed of reception side is relatively slow, the code length is changed to be shortened, and when the processing speed of reception side is relatively fast, the code length is changed to be lengthened. Further, the encoding method may also be configured such that when the packet loss ratio is relatively high, the code length is changed to be lengthened, and when the packet loss ratio is relatively low, the code length is changed to be shortened.

Further, in the above description, a method is described in which the data amount to be included in the block which is a target for encoding is adjusted according to, for example, the processing speed of the receiving side. However, a method in which the quantity of packets capable of being transmitted without waiting for the ACK as in the window size of the TCP is adjusted may be considered as well. Even in a case where the packet quantity adjustment method is applied, it is possible to avoid a situation where the memory of the application layer is overflowed due to the delay in writing into the file.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method executed by an information processing apparatus capable of transmitting data to another information processing apparatus, the method comprising:
    setting a first threshold as an amount of data capable of being transmitted without waiting for a reply from the another information processing apparatus;
    transmitting first encoded data having a data amount less than or equal to the first threshold to the another information processing apparatus;
    acquiring, from the another information processing apparatus, a retransmission request including a processing time taken to execute a one-time loss correction decoding process by the another information processing apparatus and an amount of data in the first encoded data that is recovered by the one-time loss correction decoding process, the retransmission request being acquired when all of the data included in the first encoded data is not recovered by the one-time loss correction decoding process;
    changing the first threshold concerning the data amount into a second threshold based on the processing time and the amount of data in the retransmission request;
    generating second encoded data having another data amount less than or equal to the second threshold; and
    transmitting the second encoded data to the another information processing apparatus for another loss correction decoding process,
    wherein the second threshold is less than the first threshold.

2. The communication method according to claim 1, wherein the processing time includes a time until a decoded first data is written into a predetermined storage device after the another information processing apparatus starts the one-time loss correction decoding process for the first encoded data.

3. The communication method according to claim 1, further comprising:
    changing the first threshold and the second threshold for the data amount based on a combination of the processing time and a communication situation at the time when the first encoded data is transmitted.

4. The communication method according to claim 1, further comprising:
    limiting an amount of second data before encoding based on the second threshold or an encoding ratio of the second data is changed such that the amount of the second data after encoding is limited based on the second threshold, in the transmission of the second data.

5. A non-transitory computer-readable storage medium storing a computer executable program that, when executed, causes the computer to perform a process executed by the computer capable of transmitting data to another computer, the process comprising:
    setting a first threshold as an amount of data capable of being transmitted without waiting for a reply from the another computer;
    transmitting first encoded data having a data amount less than or equal to the first threshold to the another computer;
    acquiring, from the another computer, a retransmission request including a processing time taken to execute a one-time loss correction decoding process by the another computer and an amount of data in the first encoded data that is recovered by the one-time loss correction decoding process, the retransmission request being acquired when all of the data included in the first encoded data is not recovered by the one-time loss correction decoding process;
    changing the first threshold concerning the data amount into a second threshold based on the processing time and the amount of data in the retransmission request;
    generating second encoded data having another data amount less than or equal to the second threshold; and
    transmitting the second encoded data to the another computer for another loss correction decoding process,
    wherein the second threshold is less than the first threshold.

6. A system comprising:
    a first apparatus and a second apparatus,
    wherein the first apparatus includes first circuitry configured to:
        set a first threshold as an amount of data capable of being transmitted without waiting for a reply from the second apparatus, transmit first encoded data having a data amount less than or equal to the first threshold to the second apparatus, acquire, from the second apparatus, a retransmission request including a processing time taken to execute an one-time loss correction decoding process by the second apparatus and an amount of data in the first encoded data that is recovered by the one-time loss correction decoding process, change the first threshold concerning the data amount into a second threshold based on the processing time and the amount of data in the retransmission request, generate second encoded data having another data amount less than or equal to the second threshold, and transmit the second encoded data to the second apparatus, wherein the second apparatus including second circuitry configured to:

receive the first encoded data from the first apparatus, execute the one-time loss correction decoding process for the first encoded data, transmit the retransmission request to the first apparatus when all of the data included in the first encoded data is not recovered by the one-time loss correction decoding process, and receive the second encoded data from the first apparatus for another loss correction decoding process, and wherein the second threshold is less than the first threshold.

* * * * *